United States Patent
Oehring et al.

(10) Patent No.: US 11,208,878 B2
(45) Date of Patent: Dec. 28, 2021

(54) MODULAR SWITCHGEAR SYSTEM AND POWER DISTRIBUTION FOR ELECTRIC OILFIELD EQUIPMENT

(71) Applicant: U.S. Well Services, LLC, Houston, TX (US)

(72) Inventors: Jared Oehring, Houston, TX (US); Brandon N. Hinderliter, Houston, TX (US); Lon Robinson, Houston, TX (US)

(73) Assignee: U.S. Well Services, LLC, Houston, TX (US)

( * ) Notice: Subject to any disclaimer, the term of this patent is extended or adjusted under 35 U.S.C. 154(b) by 0 days.

(21) Appl. No.: 16/597,014

(22) Filed: Oct. 9, 2019

(65) Prior Publication Data

US 2020/0109617 A1  Apr. 9, 2020

Related U.S. Application Data

(60) Provisional application No. 62/743,360, filed on Oct. 9, 2018, provisional application No. 62/743,299, filed on Oct. 9, 2018.

(51) Int. Cl.
*E21B 43/26* (2006.01)
*F04B 17/03* (2006.01)
(Continued)

(52) U.S. Cl.
CPC ............ *E21B 43/26* (2013.01); *F02B 63/047* (2013.01); *F02B 63/06* (2013.01); *F04B 1/00* (2013.01);
(Continued)

(58) Field of Classification Search
CPC ........ F04B 17/06; F04B 17/03; F02B 63/047; F02B 63/06; E21B 43/26
See application file for complete search history.

(56) References Cited

U.S. PATENT DOCUMENTS

| 1,656,861 A | 1/1928 | Leonard |
| 1,671,436 A | 5/1928 | Melott |

(Continued)

FOREIGN PATENT DOCUMENTS

| CA | 2406801 | 11/2001 |
| CA | 2707269 | 12/2010 |

(Continued)

OTHER PUBLICATIONS

Non-Final Office Action issued in U.S. Appl. No. 14/881,535 dated May 20, 2020.

(Continued)

*Primary Examiner* — Christopher S Bobish
(74) *Attorney, Agent, or Firm* — Hogan Lovells US LLP

(57) ABSTRACT

A hydraulic fracturing system for fracturing a subterranean formation includes a support structure that includes an electric powered pump, arranged in a first area, the electric powered pump powered by at least one electric motor, also arranged in the first area. The system further includes a variable frequency drive (VFD), arranged in a second area proximate the first area, connected to the at least one electric motor to control the speed of the at least one electric motor. The system includes a transformer, arranged in a third area proximate the second area. The system also includes a cooling system, arranged in a fourth area proximate the third area, the cooling system providing a cooling fluid to the VFD via one or more headers.

10 Claims, 15 Drawing Sheets

(51) Int. Cl.
| | |
|---|---|
| *F04B 17/06* | (2006.01) |
| *F04B 1/00* | (2020.01) |
| *F04B 15/02* | (2006.01) |
| *H02B 13/00* | (2006.01) |
| *H01F 27/02* | (2006.01) |
| *H02G 3/04* | (2006.01) |
| *H02B 1/20* | (2006.01) |
| *H01F 38/14* | (2006.01) |
| *F02B 63/04* | (2006.01) |
| *F02B 63/06* | (2006.01) |

(52) U.S. Cl.
CPC .............. *F04B 15/02* (2013.01); *F04B 17/03* (2013.01); *F04B 17/06* (2013.01); *H01F 27/02* (2013.01); *H01F 38/14* (2013.01); *H02B 1/20* (2013.01); *H02B 13/00* (2013.01); *H02G 3/0437* (2013.01)

(56) References Cited

U.S. PATENT DOCUMENTS

| | | | |
|---|---|---|---|
| 2,004,077 A | 6/1935 | McCartney | |
| 2,183,364 A | 12/1939 | Bailey | |
| 2,220,622 A | 11/1940 | Aitken | |
| 2,248,051 A | 7/1941 | Armstrong | |
| 2,407,796 A | 9/1946 | Page | |
| 2,416,848 A | 3/1947 | Rothery | |
| 2,610,741 A | 9/1952 | Schmid | |
| 2,753,940 A | 7/1956 | Bonner | |
| 3,055,682 A | 9/1962 | Bacher | |
| 3,061,039 A | 10/1962 | Peters | |
| 3,066,503 A | 12/1962 | Fleming | |
| 3,302,069 A * | 1/1967 | Wilcox | H02B 7/00 361/611 |
| 3,334,495 A | 8/1967 | Jensen | |
| 3,722,595 A | 3/1973 | Kiel | |
| 3,764,233 A | 10/1973 | Strickland | |
| 3,773,140 A | 11/1973 | Mahajan | |
| 3,837,179 A | 9/1974 | Barth | |
| 3,849,662 A | 11/1974 | Blaskowski | |
| 3,878,884 A | 4/1975 | Raleigh | |
| 3,881,551 A | 5/1975 | Terry | |
| 4,037,431 A | 7/1977 | Sugimoto | |
| 4,100,822 A | 7/1978 | Rosman | |
| 4,151,575 A | 4/1979 | Hogue | |
| 4,226,299 A | 10/1980 | Hansen | |
| 4,265,266 A | 5/1981 | Kierbow et al. | |
| 4,432,064 A | 2/1984 | Barker | |
| 4,442,665 A | 4/1984 | Fick et al. | |
| 4,456,092 A | 6/1984 | Kubozuka | |
| 4,506,982 A | 3/1985 | Smithers et al. | |
| 4,512,387 A | 4/1985 | Rodriguez | |
| 4,529,887 A | 7/1985 | Johnson | |
| 4,538,916 A | 9/1985 | Zimmerman | |
| 4,676,063 A | 6/1987 | Goebel et al. | |
| 4,759,674 A | 7/1988 | Schroder | |
| 4,793,386 A | 12/1988 | Sloan | |
| 4,845,981 A | 7/1989 | Pearson | |
| 4,922,463 A | 5/1990 | Del Zotto et al. | |
| 5,004,400 A | 4/1991 | Handke | |
| 5,006,044 A | 4/1991 | Walker, Sr. | |
| 5,025,861 A | 6/1991 | Huber | |
| 5,050,673 A | 9/1991 | Baldridge | |
| 5,114,239 A | 5/1992 | Allen | |
| 5,130,628 A | 7/1992 | Owen | |
| 5,131,472 A | 7/1992 | Dees et al. | |
| 5,172,009 A | 12/1992 | Mohan | |
| 5,189,388 A | 2/1993 | Mosley | |
| 5,230,366 A | 7/1993 | Marandi | |
| 5,334,899 A | 8/1994 | Skybyk | |
| 5,366,324 A | 11/1994 | Arlt | |
| 5,422,550 A | 6/1995 | McClanahan | |
| 5,433,243 A | 7/1995 | Griswold | |
| 5,439,066 A | 8/1995 | Gipson | |
| 5,517,822 A | 5/1996 | Haws et al. | |
| 5,548,093 A | 8/1996 | Sato | |
| 5,590,976 A | 1/1997 | Kilheffer et al. | |
| 5,655,361 A | 8/1997 | Kishi | |
| 5,736,838 A | 4/1998 | Dove et al. | |
| 5,755,096 A | 5/1998 | Holleyman | |
| 5,790,972 A | 8/1998 | Kohlenberger | |
| 5,798,596 A | 8/1998 | Lordo | |
| 5,865,247 A | 2/1999 | Paterson | |
| 5,879,137 A | 3/1999 | Yie | |
| 5,894,888 A | 4/1999 | Wiemers | |
| 5,907,970 A | 6/1999 | Havlovick et al. | |
| 5,950,726 A | 9/1999 | Roberts | |
| 6,035,265 A | 3/2000 | Dister et al. | |
| 6,097,310 A | 8/2000 | Harrell et al. | |
| 6,121,705 A | 9/2000 | Hoong | |
| 6,138,764 A | 10/2000 | Scarsdale et al. | |
| 6,142,878 A | 11/2000 | Barin | |
| 6,164,910 A | 12/2000 | Mayleben | |
| 6,202,702 B1 | 3/2001 | Ohira | |
| 6,208,098 B1 | 3/2001 | Kume | |
| 6,254,462 B1 | 7/2001 | Kelton | |
| 6,271,637 B1 | 8/2001 | Kushion | |
| 6,273,193 B1 | 8/2001 | Hermann | |
| 6,315,523 B1 | 11/2001 | Mills | |
| 6,477,852 B2 | 11/2002 | Dodo | |
| 6,484,490 B1 | 11/2002 | Olsen | |
| 6,491,098 B1 | 12/2002 | Dallas | |
| 6,529,135 B1 | 3/2003 | Bowers et al. | |
| 6,626,646 B2 | 9/2003 | Rajewski | |
| 6,719,900 B2 | 4/2004 | Hawkins | |
| 6,765,304 B2 | 7/2004 | Baten et al. | |
| 6,776,227 B2 | 8/2004 | Beida | |
| 6,788,022 B2 | 9/2004 | Sopko | |
| 6,802,690 B2 | 10/2004 | Han | |
| 6,808,303 B2 | 10/2004 | Fisher | |
| 6,931,310 B2 | 8/2005 | Shimizu et al. | |
| 6,936,947 B1 * | 8/2005 | Leijon | H02K 11/048 310/196 |
| 6,985,750 B1 | 1/2006 | Vicknair et al. | |
| 7,082,993 B2 | 8/2006 | Ayoub | |
| 7,104,233 B2 | 9/2006 | Ryczek et al. | |
| 7,170,262 B2 | 1/2007 | Pettigrew | |
| 7,173,399 B2 | 2/2007 | Sihler | |
| 7,308,933 B1 | 12/2007 | Mayfield | |
| 7,312,593 B1 | 12/2007 | Streicher et al. | |
| 7,336,514 B2 | 2/2008 | Amarillas | |
| 7,445,041 B2 | 11/2008 | O'Brien | |
| 7,494,263 B2 | 2/2009 | Dykstra et al. | |
| 7,500,642 B2 | 3/2009 | Cunningham | |
| 7,525,264 B2 | 4/2009 | Dodge | |
| 7,563,076 B2 | 7/2009 | Brunet | |
| 7,581,379 B2 | 9/2009 | Yoshida | |
| 7,675,189 B2 | 3/2010 | Grenier | |
| 7,683,499 B2 | 3/2010 | Saucier | |
| 7,717,193 B2 | 5/2010 | Egilsson et al. | |
| 7,755,310 B2 | 7/2010 | West et al. | |
| 7,795,830 B2 | 9/2010 | Johnson | |
| 7,807,048 B2 | 10/2010 | Collette | |
| 7,835,140 B2 * | 11/2010 | Mori | H02B 1/22 361/604 |
| 7,845,413 B2 | 12/2010 | Shampine et al. | |
| 7,926,562 B2 | 4/2011 | Poitzsch | |
| 7,894,757 B2 | 7/2011 | Keast | |
| 7,977,824 B2 | 7/2011 | Halen et al. | |
| 7,984,757 B1 | 7/2011 | Keast | |
| 8,037,936 B2 | 10/2011 | Neuroth | |
| 8,054,084 B2 | 11/2011 | Schulz et al. | |
| 8,083,504 B2 | 12/2011 | Williams | |
| 8,091,928 B2 | 1/2012 | Carrier | |
| 8,096,354 B2 | 1/2012 | Poitzsch | |
| 8,096,891 B2 | 1/2012 | Lochtefeld | |
| 8,139,383 B2 | 3/2012 | Efraimsson | |
| 8,146,665 B2 | 4/2012 | Neal | |
| 8,154,419 B2 | 4/2012 | Daussin et al. | |
| 8,232,892 B2 | 7/2012 | Overholt et al. | |
| 8,261,528 B2 | 9/2012 | Chillar | |
| 8,272,439 B2 | 9/2012 | Strickland | |
| 8,310,272 B2 | 11/2012 | Quarto | |

(56) References Cited

U.S. PATENT DOCUMENTS

| | | | |
|---|---|---|---|
| 8,354,817 B2 | 1/2013 | Yeh et al. | |
| 8,474,521 B2 | 7/2013 | Kajaria | |
| 8,506,267 B2 | 8/2013 | Gambier et al. | |
| 8,534,235 B2 | 9/2013 | Chandler | |
| 8,573,303 B2 | 11/2013 | Kerfoot | |
| 8,596,056 B2 | 12/2013 | Woodmansee | |
| 8,616,005 B1 | 12/2013 | Cousino | |
| 8,616,274 B2 | 12/2013 | Belcher et al. | |
| 8,646,521 B2 | 2/2014 | Bowen | |
| 8,692,408 B2 | 4/2014 | Zhang et al. | |
| 8,727,068 B2 | 5/2014 | Bruin | |
| 8,760,657 B2 | 6/2014 | Pope | |
| 8,763,387 B2 | 7/2014 | Schmidt | |
| 8,774,972 B2 | 7/2014 | Rusnak | |
| 8,789,601 B2 | 7/2014 | Broussard | |
| 8,795,525 B2 | 8/2014 | McGinnis et al. | |
| 8,800,652 B2 | 8/2014 | Bartko | |
| 8,807,960 B2 | 8/2014 | Stephenson | |
| 8,838,341 B2 | 9/2014 | Kumano | |
| 8,851,860 B1 | 10/2014 | Mail | |
| 8,857,506 B2 | 10/2014 | Stone, Jr. | |
| 8,899,940 B2 | 12/2014 | Laugemors | |
| 8,905,056 B2 | 12/2014 | Kendrick | |
| 8,905,138 B2 | 12/2014 | Lundstedt et al. | |
| 8,997,904 B2 | 4/2015 | Cryer | |
| 9,018,881 B2 | 4/2015 | Mao et al. | |
| 9,051,822 B2 | 6/2015 | Ayan | |
| 9,051,923 B2 | 6/2015 | Kuo | |
| 9,061,223 B2 | 6/2015 | Winborn | |
| 9,062,545 B2 | 6/2015 | Roberts et al. | |
| 9,067,182 B2 | 6/2015 | Nichols | |
| 9,103,193 B2 * | 8/2015 | Coli | F04B 17/03 |
| 9,119,326 B2 | 8/2015 | McDonnell | |
| 9,121,257 B2 | 9/2015 | Coli et al. | |
| 9,140,110 B2 | 9/2015 | Coli et al. | |
| 9,160,168 B2 | 10/2015 | Chapel | |
| 9,260,253 B2 | 2/2016 | Naizer | |
| 9,322,239 B2 | 4/2016 | Angeles Boza et al. | |
| 9,324,049 B2 | 4/2016 | Thomeer | |
| 9,340,353 B2 | 5/2016 | Oren | |
| 9,366,114 B2 | 6/2016 | Coli et al. | |
| 9,410,410 B2 | 8/2016 | Broussard et al. | |
| 9,450,385 B2 | 9/2016 | Kristensen | |
| 9,475,020 B2 | 10/2016 | Coli et al. | |
| 9,475,021 B2 | 10/2016 | Coli et al. | |
| 9,482,086 B2 | 11/2016 | Richardson et al. | |
| 9,499,335 B2 | 11/2016 | McIver | |
| 9,506,333 B2 | 11/2016 | Castillo et al. | |
| 9,513,055 B1 | 12/2016 | Seal | |
| 9,534,473 B2 | 1/2017 | Morris et al. | |
| 9,562,420 B2 | 2/2017 | Morris et al. | |
| 9,587,649 B2 | 3/2017 | Oehring | |
| 9,611,728 B2 | 4/2017 | Oehring | |
| 9,650,871 B2 | 5/2017 | Oehring et al. | |
| 9,650,879 B2 | 5/2017 | Broussard et al. | |
| 9,706,185 B2 | 7/2017 | Ellis | |
| 9,728,354 B2 * | 8/2017 | Skolozdra | H01H 15/06 |
| 9,738,461 B2 | 8/2017 | DeGaray | |
| 9,739,546 B2 | 8/2017 | Bertilsson et al. | |
| 9,745,840 B2 | 8/2017 | Oehring et al. | |
| 9,840,901 B2 | 12/2017 | Oehring et al. | |
| 9,863,228 B2 | 1/2018 | Shampine et al. | |
| 9,893,500 B2 | 2/2018 | Oehring | |
| 9,909,398 B2 | 3/2018 | Pham | |
| 9,915,128 B2 | 3/2018 | Hunter | |
| 9,932,799 B2 * | 4/2018 | Symchuk | F17C 9/02 |
| 9,963,961 B2 | 5/2018 | Hardin | |
| 9,970,278 B2 | 5/2018 | Broussard | |
| 9,976,351 B2 | 5/2018 | Randall | |
| 9,995,218 B2 | 6/2018 | Oehring | |
| 10,008,880 B2 | 6/2018 | Vicknair | |
| 10,020,711 B2 | 7/2018 | Oehring | |
| 10,036,238 B2 | 7/2018 | Oehring | |
| 10,107,086 B2 | 10/2018 | Oehring | |
| 10,119,381 B2 | 11/2018 | Oehring | |
| 10,184,465 B2 | 1/2019 | Enis et al. | |
| 10,196,878 B2 | 2/2019 | Hunter | |
| 10,221,639 B2 | 3/2019 | Romer et al. | |
| 10,227,854 B2 * | 3/2019 | Glass | E21B 43/267 |
| 10,232,332 B2 | 3/2019 | Oehring | |
| 10,246,984 B2 | 4/2019 | Payne | |
| 10,254,732 B2 | 4/2019 | Oehring | |
| 10,260,327 B2 | 4/2019 | Kajaria | |
| 10,280,724 B2 | 5/2019 | Hinderliter | |
| 10,287,873 B2 | 5/2019 | Filas | |
| 10,302,079 B2 | 5/2019 | Kendrick | |
| 10,309,205 B2 | 6/2019 | Randall | |
| 10,337,308 B2 | 7/2019 | Broussard | |
| 10,371,012 B2 * | 8/2019 | Davis | G01B 11/27 |
| 10,378,326 B2 * | 8/2019 | Morris | F04B 23/04 |
| 10,393,108 B2 * | 8/2019 | Chong | F04B 49/20 |
| 10,407,990 B2 | 9/2019 | Oehring | |
| 10,408,030 B2 | 9/2019 | Oehring et al. | |
| 10,408,031 B2 | 9/2019 | Oehring et al. | |
| 10,415,332 B2 | 9/2019 | Morris et al. | |
| 10,436,026 B2 | 10/2019 | Ounadjela | |
| 10,627,003 B2 | 4/2020 | Dale et al. | |
| 10,648,311 B2 | 5/2020 | Oehring et al. | |
| 10,669,471 B2 | 6/2020 | Schmidt et al. | |
| 10,669,804 B2 | 6/2020 | Kotrla | |
| 10,695,950 B2 | 6/2020 | Igo et al. | |
| 10,711,576 B2 | 7/2020 | Bishop | |
| 10,740,730 B2 | 8/2020 | Altamirano et al. | |
| 10,794,165 B2 | 10/2020 | Fischer et al. | |
| 2001/0000996 A1 | 5/2001 | Grimland et al. | |
| 2002/0169523 A1 | 11/2002 | Ross et al. | |
| 2003/0056514 A1 | 3/2003 | Lohn | |
| 2003/0079875 A1 | 5/2003 | Weng | |
| 2003/0138327 A1 | 7/2003 | Jones et al. | |
| 2004/0040746 A1 | 3/2004 | Niedermayr et al. | |
| 2004/0102109 A1 | 5/2004 | Cratty et al. | |
| 2004/0167738 A1 | 8/2004 | Miller | |
| 2005/0061548 A1 | 3/2005 | Hooper | |
| 2005/0116541 A1 | 6/2005 | Seiver | |
| 2005/0201197 A1 | 9/2005 | Duell et al. | |
| 2005/0274508 A1 | 12/2005 | Folk | |
| 2006/0052903 A1 | 3/2006 | Bassett | |
| 2006/0065319 A1 | 3/2006 | Csitari | |
| 2006/0109141 A1 | 5/2006 | Huang | |
| 2007/0131410 A1 | 6/2007 | Hill | |
| 2007/0187163 A1 | 8/2007 | Cone | |
| 2007/0201305 A1 | 8/2007 | Heilman et al. | |
| 2007/0226089 A1 | 9/2007 | DeGaray et al. | |
| 2007/0277982 A1 | 12/2007 | Shampine | |
| 2007/0278140 A1 | 12/2007 | Mallet et al. | |
| 2008/0017369 A1 | 1/2008 | Sarada | |
| 2008/0041596 A1 | 2/2008 | Blount | |
| 2008/0095644 A1 | 4/2008 | Mantei et al. | |
| 2008/0112802 A1 | 5/2008 | Orlando | |
| 2008/0137266 A1 | 6/2008 | Jensen | |
| 2008/0164023 A1 | 7/2008 | Dykstra et al. | |
| 2008/0208478 A1 | 8/2008 | Ella et al. | |
| 2008/0217024 A1 | 9/2008 | Moore | |
| 2008/0257449 A1 | 10/2008 | Weinstein et al. | |
| 2008/0264625 A1 | 10/2008 | Ochoa | |
| 2008/0264649 A1 | 10/2008 | Crawford | |
| 2008/0277120 A1 | 11/2008 | Hickie | |
| 2009/0045782 A1 | 2/2009 | Datta | |
| 2009/0065299 A1 | 3/2009 | Vito | |
| 2009/0072645 A1 | 3/2009 | Quere | |
| 2009/0078410 A1 | 3/2009 | Krenek et al. | |
| 2009/0093317 A1 | 4/2009 | Kajiwara et al. | |
| 2009/0095482 A1 | 4/2009 | Surjaatmadja | |
| 2009/0145611 A1 | 6/2009 | Pallini, Jr. | |
| 2009/0153354 A1 | 6/2009 | Daussin et al. | |
| 2009/0188181 A1 | 7/2009 | Forbis | |
| 2009/0200035 A1 | 8/2009 | Bjerkreim et al. | |
| 2009/0260826 A1 | 10/2009 | Sherwood | |
| 2009/0308602 A1 | 12/2009 | Bruins et al. | |
| 2010/0000508 A1 | 1/2010 | Chandler | |
| 2010/0019574 A1 | 1/2010 | Baldassarre et al. | |
| 2010/0038907 A1 | 2/2010 | Hunt | |
| 2010/0045109 A1 | 2/2010 | Arnold | |
| 2010/0051272 A1 | 3/2010 | Loree et al. | |

(56) References Cited

U.S. PATENT DOCUMENTS

| | | |
|---|---|---|
| 2010/0132949 A1 | 6/2010 | DeFosse et al. |
| 2010/0146981 A1 | 6/2010 | Motakef |
| 2010/0172202 A1 | 7/2010 | Borgstadt |
| 2010/0250139 A1 | 9/2010 | Hobbs et al. |
| 2010/0293973 A1 | 11/2010 | Erickson |
| 2010/0303655 A1 | 12/2010 | Scekic |
| 2010/0322802 A1 | 12/2010 | Kugelev |
| 2011/0005757 A1 | 1/2011 | Hebert |
| 2011/0017468 A1 | 1/2011 | Birch et al. |
| 2011/0052423 A1 | 3/2011 | Gambier |
| 2011/0061855 A1 | 3/2011 | Case et al. |
| 2011/0081268 A1 | 4/2011 | Ochoa et al. |
| 2011/0085924 A1 | 4/2011 | Shampine |
| 2011/0110793 A1 | 5/2011 | Leugemors et al. |
| 2011/0166046 A1 | 7/2011 | Weaver |
| 2011/0247878 A1 | 10/2011 | Rasheed |
| 2011/0272158 A1 | 11/2011 | Neal |
| 2012/0018016 A1 | 1/2012 | Gibson |
| 2012/0049625 A1 | 3/2012 | Hopwood |
| 2012/0063936 A1 | 3/2012 | Baxter et al. |
| 2012/0085541 A1 | 4/2012 | Love et al. |
| 2012/0127635 A1 | 5/2012 | Grindeland |
| 2012/0150455 A1 | 6/2012 | Franklin et al. |
| 2012/0152716 A1 | 6/2012 | Kikukawa et al. |
| 2012/0205301 A1 | 8/2012 | McGuire et al. |
| 2012/0205400 A1 | 8/2012 | DeGaray et al. |
| 2012/0222865 A1 | 9/2012 | Larson |
| 2012/0232728 A1 | 9/2012 | Karimi et al. |
| 2012/0247783 A1 | 10/2012 | Berner, Jr. |
| 2012/0255734 A1 | 10/2012 | Coli et al. |
| 2013/0009469 A1 | 1/2013 | Gillett |
| 2013/0025706 A1 | 1/2013 | DeGaray et al. |
| 2013/0175038 A1 | 7/2013 | Conrad |
| 2013/0175039 A1 | 7/2013 | Guidry |
| 2013/0180722 A1 | 7/2013 | Olarte Caro |
| 2013/0189629 A1 | 7/2013 | Chandler |
| 2013/0199617 A1 | 8/2013 | DeGaray et al. |
| 2013/0233542 A1 | 9/2013 | Shampine |
| 2013/0255271 A1 | 10/2013 | Yu et al. |
| 2013/0284278 A1 | 10/2013 | Winborn |
| 2013/0284455 A1 | 10/2013 | Kajaria et al. |
| 2013/0299167 A1 | 11/2013 | Fordyce |
| 2013/0306322 A1 | 11/2013 | Sanborn |
| 2013/0317750 A1 | 11/2013 | Hunter |
| 2013/0341029 A1 | 12/2013 | Roberts et al. |
| 2013/0343858 A1 | 12/2013 | Flusche |
| 2014/0000899 A1 | 1/2014 | Nevison |
| 2014/0010671 A1 | 1/2014 | Cryer et al. |
| 2014/0054965 A1 | 2/2014 | Jain |
| 2014/0060658 A1 | 3/2014 | Hains |
| 2014/0095114 A1* | 4/2014 | Thomeer .............. G06Q 10/20 |
| | | 702/187 |
| 2014/0096974 A1 | 4/2014 | Coli |
| 2014/0124162 A1 | 5/2014 | Leavitt |
| 2014/0138079 A1 | 5/2014 | Broussard |
| 2014/0174717 A1 | 6/2014 | Broussard et al. |
| 2014/0219824 A1* | 8/2014 | Burnette .............. F04B 23/06 |
| | | 417/53 |
| 2014/0238683 A1 | 8/2014 | Korach |
| 2014/0246211 A1 | 9/2014 | Guidry et al. |
| 2014/0251623 A1 | 9/2014 | Lestz et al. |
| 2014/0255214 A1 | 9/2014 | Burnette |
| 2014/0277772 A1 | 9/2014 | Lopez |
| 2014/0290768 A1 | 10/2014 | Randle |
| 2014/0379300 A1 | 12/2014 | Devine |
| 2015/0027712 A1* | 1/2015 | Vicknair .............. E21B 43/162 |
| | | 166/305.1 |
| 2015/0053426 A1 | 2/2015 | Smith |
| 2015/0068724 A1 | 3/2015 | Coli et al. |
| 2015/0068754 A1 | 3/2015 | Coli et al. |
| 2015/0075778 A1 | 3/2015 | Walters |
| 2015/0083426 A1 | 3/2015 | Lesko |
| 2015/0097504 A1 | 4/2015 | Lamascus |
| 2015/0114652 A1* | 4/2015 | Lestz .............. E21B 43/26 |
| | | 166/308.1 |
| 2015/0136043 A1 | 5/2015 | Shaaban |
| 2015/0144336 A1 | 5/2015 | Hardin et al. |
| 2015/0147194 A1 | 5/2015 | Foote |
| 2015/0159911 A1 | 6/2015 | Holt |
| 2015/0175013 A1 | 6/2015 | Cryer et al. |
| 2015/0176386 A1 | 6/2015 | Castillo et al. |
| 2015/0211512 A1 | 7/2015 | Wiegman |
| 2015/0211524 A1 | 7/2015 | Broussard |
| 2015/0217672 A1 | 8/2015 | Shampine |
| 2015/0225113 A1 | 8/2015 | Lungu |
| 2015/0233530 A1 | 8/2015 | Sandidge |
| 2015/0252661 A1* | 9/2015 | Glass .............. E21B 43/267 |
| | | 166/308.1 |
| 2015/0300145 A1 | 10/2015 | Coli et al. |
| 2015/0300336 A1 | 10/2015 | Hernandez |
| 2015/0314225 A1 | 11/2015 | Coli et al. |
| 2015/0330172 A1 | 11/2015 | Allmaras |
| 2015/0354322 A1 | 12/2015 | Vicknair |
| 2016/0006311 A1 | 1/2016 | Li |
| 2016/0032703 A1 | 2/2016 | Broussard et al. |
| 2016/0102537 A1 | 4/2016 | Lopez |
| 2016/0105022 A1* | 4/2016 | Oehring .............. E21B 43/26 |
| | | 700/293 |
| 2016/0208592 A1 | 4/2016 | Oehring |
| 2016/0160889 A1 | 6/2016 | Hoffman et al. |
| 2016/0177675 A1 | 6/2016 | Morris et al. |
| 2016/0177678 A1 | 6/2016 | Morris |
| 2016/0186531 A1 | 6/2016 | Harkless et al. |
| 2016/0208593 A1 | 7/2016 | Coli et al. |
| 2016/0208594 A1 | 7/2016 | Coli et al. |
| 2016/0208595 A1 | 7/2016 | Tang |
| 2016/0221220 A1 | 8/2016 | Paige |
| 2016/0230524 A1 | 8/2016 | Dumoit |
| 2016/0230525 A1 | 8/2016 | Lestz et al. |
| 2016/0258267 A1 | 9/2016 | Payne |
| 2016/0265457 A1 | 9/2016 | Stephenson |
| 2016/0273328 A1 | 9/2016 | Oehring |
| 2016/0273456 A1 | 9/2016 | Zhang et al. |
| 2016/0281484 A1 | 9/2016 | Lestz |
| 2016/0290114 A1 | 10/2016 | Oehring |
| 2016/0290563 A1 | 10/2016 | Diggins |
| 2016/0312108 A1 | 10/2016 | Lestz et al. |
| 2016/0319650 A1 | 11/2016 | Oehring |
| 2016/0326853 A1 | 11/2016 | Fred et al. |
| 2016/0326854 A1 | 11/2016 | Broussard |
| 2016/0326855 A1 | 11/2016 | Coli et al. |
| 2016/0341281 A1 | 11/2016 | Brunvold et al. |
| 2016/0348479 A1 | 12/2016 | Oehring |
| 2016/0349728 A1 | 12/2016 | Oehring |
| 2016/0369609 A1 | 12/2016 | Morris et al. |
| 2017/0016433 A1 | 1/2017 | Chong |
| 2017/0021318 A1 | 1/2017 | McIver et al. |
| 2017/0022788 A1 | 1/2017 | Oehring et al. |
| 2017/0022807 A1 | 1/2017 | Dursun |
| 2017/0028368 A1 | 2/2017 | Oehring et al. |
| 2017/0030177 A1* | 2/2017 | Oehring .............. E21B 7/02 |
| 2017/0030178 A1 | 2/2017 | Oehring et al. |
| 2017/0036178 A1 | 2/2017 | Coli et al. |
| 2017/0036872 A1 | 2/2017 | Wallace |
| 2017/0037717 A1 | 2/2017 | Oehring |
| 2017/0037718 A1 | 2/2017 | Coli et al. |
| 2017/0043280 A1 | 2/2017 | Vankouwenberg |
| 2017/0051732 A1* | 2/2017 | Hernandez .............. F04B 17/06 |
| 2017/0074076 A1 | 3/2017 | Joseph et al. |
| 2017/0082033 A1 | 3/2017 | Wu et al. |
| 2017/0096885 A1 | 4/2017 | Oehring |
| 2017/0096889 A1 | 4/2017 | Blanckaert et al. |
| 2017/0104389 A1* | 4/2017 | Morris .............. F01D 15/10 |
| 2017/0114625 A1* | 4/2017 | Norris .............. E21B 47/0007 |
| 2017/0130743 A1 | 5/2017 | Anderson |
| 2017/0138171 A1 | 5/2017 | Richards et al. |
| 2017/0145918 A1 | 5/2017 | Oehring |
| 2017/0146189 A1 | 5/2017 | Herman |
| 2017/0159570 A1 | 6/2017 | Bickert |
| 2017/0159654 A1 | 6/2017 | Kendrick |
| 2017/0175516 A1 | 6/2017 | Eslinger |
| 2017/0204852 A1 | 7/2017 | Barnett |
| 2017/0212535 A1 | 7/2017 | Shelman et al. |
| 2017/0218727 A1 | 8/2017 | Oehring |

(56) References Cited

U.S. PATENT DOCUMENTS

| | | | |
|---|---|---|---|
| 2017/0218843 A1 | 8/2017 | Oehring | |
| 2017/0222409 A1* | 8/2017 | Oehring | E21B 41/00 |
| 2017/0226838 A1 | 8/2017 | Ciezobka | |
| 2017/0226839 A1 | 8/2017 | Broussard | |
| 2017/0226842 A1 | 8/2017 | Omont et al. | |
| 2017/0234250 A1 | 8/2017 | Janik | |
| 2017/0241221 A1 | 8/2017 | Seshadri | |
| 2017/0259227 A1 | 9/2017 | Morris et al. | |
| 2017/0292513 A1 | 10/2017 | Haddad | |
| 2017/0313499 A1 | 11/2017 | Hughes et al. | |
| 2017/0314380 A1 | 11/2017 | Oehring | |
| 2017/0314979 A1 | 11/2017 | Ye | |
| 2017/0328179 A1 | 11/2017 | Dykstra | |
| 2017/0369258 A1 | 12/2017 | DeGaray | |
| 2017/0370639 A1 | 12/2017 | Barden et al. | |
| 2018/0028992 A1 | 2/2018 | Stegemoeller | |
| 2018/0038216 A1 | 2/2018 | Zhang | |
| 2018/0045331 A1 | 2/2018 | Lopez | |
| 2018/0090914 A1* | 3/2018 | Johnson | H02B 1/565 |
| 2018/0156210 A1 | 6/2018 | Oehring | |
| 2018/0181830 A1 | 6/2018 | Luharuka et al. | |
| 2018/0183219 A1 | 6/2018 | Oehring | |
| 2018/0216455 A1 | 8/2018 | Andreychuk | |
| 2018/0238147 A1 | 8/2018 | Shahri | |
| 2018/0245428 A1 | 8/2018 | Richards | |
| 2018/0258746 A1* | 9/2018 | Broussard | E21B 43/26 |
| 2018/0259080 A1 | 9/2018 | Dale et al. | |
| 2018/0266217 A1 | 9/2018 | Funkhauser et al. | |
| 2018/0266412 A1 | 9/2018 | Stokkevag | |
| 2018/0274446 A1 | 9/2018 | Oehring | |
| 2018/0284817 A1 | 10/2018 | Cook et al. | |
| 2018/0291713 A1 | 10/2018 | Jeanson | |
| 2018/0298731 A1 | 10/2018 | Bishop | |
| 2018/0312738 A1 | 11/2018 | Rutsch et al. | |
| 2018/0313677 A1 | 11/2018 | Warren et al. | |
| 2018/0320483 A1 | 11/2018 | Zhang | |
| 2018/0343125 A1 | 11/2018 | Clish | |
| 2018/0363437 A1 | 12/2018 | Coli | |
| 2018/0363640 A1 | 12/2018 | Kajita et al. | |
| 2019/0003329 A1* | 1/2019 | Morris | E21B 21/062 |
| 2019/0010793 A1 | 1/2019 | Hinderliter | |
| 2019/0040727 A1 | 2/2019 | Oehring et al. | |
| 2019/0063309 A1* | 2/2019 | Davis | F02B 63/047 |
| 2019/0100989 A1 | 4/2019 | Stewart | |
| 2019/0112910 A1 | 4/2019 | Oehring | |
| 2019/0119096 A1 | 4/2019 | Haile | |
| 2019/0120024 A1 | 4/2019 | Oehring | |
| 2019/0128080 A1 | 5/2019 | Ross | |
| 2019/0128104 A1 | 5/2019 | Graham et al. | |
| 2019/0145251 A1 | 5/2019 | Johnson | |
| 2019/0154020 A1 | 5/2019 | Glass | |
| 2019/0162061 A1 | 5/2019 | Stepheson | |
| 2019/0169971 A1 | 6/2019 | Oehring | |
| 2019/0178057 A1 | 6/2019 | Hunter | |
| 2019/0178235 A1 | 6/2019 | Coskrey | |
| 2019/0203567 A1 | 7/2019 | Ross | |
| 2019/0203572 A1* | 7/2019 | Morris | E21B 43/26 |
| 2019/0211661 A1 | 7/2019 | Reckels | |
| 2019/0226317 A1 | 7/2019 | Payne | |
| 2019/0245348 A1 | 8/2019 | Hinderliter | |
| 2019/0249527 A1 | 8/2019 | Kraynek | |
| 2019/0257462 A1 | 8/2019 | Rogers | |
| 2019/0292866 A1 | 9/2019 | Ross | |
| 2019/0292891 A1 | 9/2019 | Kajaria | |
| 2019/0316447 A1 | 10/2019 | Oehring | |
| 2020/0047141 A1 | 2/2020 | Oehring et al. | |
| 2020/0088152 A1 | 3/2020 | Allion et al. | |
| 2020/0194976 A1* | 6/2020 | Benussi | H02B 1/20 |
| 2020/0232454 A1 | 7/2020 | Chretien | |

FOREIGN PATENT DOCUMENTS

| | | |
|---|---|---|
| CA | 2482943 | 5/2011 |
| CA | 3050131 | 11/2011 |
| CA | 2955706 | 10/2012 |
| CA | 2966672 | 10/2012 |
| CA | 3000322 | 4/2013 |
| CA | 2787814 | 2/2014 |
| CA | 2833711 | 5/2014 |
| CA | 2978706 | 9/2016 |
| CA | 2944980 | 2/2017 |
| CA | 3006422 | 6/2017 |
| CA | 3018485 | 8/2017 |
| CA | 2964593 | 10/2017 |
| CA | 2849825 | 7/2018 |
| CA | 3067854 A1 | 1/2019 |
| CA | 2919649 | 2/2019 |
| CA | 2919666 | 7/2019 |
| CA | 2797081 | 9/2019 |
| CA | 2945579 | 10/2019 |
| CN | 101977016 | 2/2011 |
| CN | 104117308 A | 10/2014 |
| CN | 104196613 A | 12/2014 |
| CN | 205986303 U | 2/2017 |
| CN | 108049999 A | 5/2018 |
| CN | 112196508 A | 1/2021 |
| JP | 2004264589 | 9/2004 |
| WO | 2016/144939 | 9/2016 |
| WO | 2016/160458 | 10/2016 |
| WO | 2018044307 A1 | 3/2018 |
| WO | 2018213925 A1 | 11/2018 |

OTHER PUBLICATIONS

Non-Final Office Action issued in U.S. Appl. No. 15/145,443 dated May 8, 2020.

Non-Final Office Action issued in U.S. Appl. No. 16/458,696 dated May 22, 2020.

International Search Report and Written Opinion issued in PCT/US2020/023809 dated Jun. 2, 2020.

Karin, "Duel Fuel Diesel Engines," (2015), Taylor & Francis, pp. 62-63, Retrieved from https://app.knovel.com/hotlink/toc/id:kpDFDE0001/dual-fueal-diesel-engines/duel-fuel-diesel-engines (Year 2015).

Goodwin, "High-voltage auxilliary switchgear for power stations," Power Engineering Journal, 1989, 10 pg. (Year 1989).

UK Power Networks—Transformers to Supply Heat to Tate Modern—from Press Releases May 16, 2013.

Non-Final Office Action issued in corresponding U.S. Appl. No. 15/293,681 dated Feb. 16, 2017.

Non-Final Office Action issued in corresponding U.S. Appl. No. 15/294,349 dated Mar. 14, 2017.

Final Office Action issued in corresponding U.S. Appl. No. 15/145,491 dated Jan. 20, 2017.

Non-Final Office Action issued in corresponding U.S. Appl. No. 15/145,443 dated Feb. 7, 2017.

Notice of Allowance issued in corresponding U.S. Appl. No. 15/217,040 dated Mar. 28, 2017.

Notice of Allowance issued in corresponding U.S. Appl. No. 14/622,532 dated Mar. 27, 2017.

Non-Final Office Action issued in corresponding U.S. Appl. No. 15/291,842 dated Jan. 6, 2017.

Final Office Action issued in corresponding U.S. Appl. No. 14/622,532 dated Dec. 7, 2016.

Non-Final Office Action issued in corresponding U.S. Appl. No. 14/622,532 dated May 17, 2016.

Final Office Action issued in corresponding U.S. Appl. No. 14/622,532 dated Dec. 21, 2015.

Non-Final Office Action issued in corresponding U.S. Appl. No. 14/622,532 dated Aug. 5, 2015.

Non-Final Office Action issued in corresponding U.S. Appl. No. 15/145,491 dated Sep. 12, 2016.

Non-Final Office Action issued in corresponding U.S. Appl. No. 15/217,040 dated Nov. 29, 2016.

Non-Final Office Action issued in corresponding U.S. Appl. No. 15/235,788 dated Dec. 14, 2016.

Non-Final Office Action issued in corresponding U.S. Appl. No. 15/145,491 dated May 15, 2017.

(56) References Cited

OTHER PUBLICATIONS

Non-Final Office Action issued in corresponding U.S. Appl. No. 15/486,970 dated Jun. 22, 2017.
Non-Final Office Action issued in corresponding U.S. Appl. No. 15/487,656 dated Jun. 23, 2017.
Non-Final Office Action issued in corresponding U.S. Appl. No. 15/487,694 dated Jun. 26, 2017.
Final Office Action issued in corresponding U.S. Appl. No. 15/294,349 dated Jul. 6, 2017.
Non-Final Office Action issued in corresponding U.S. Appl. No. 14/884,363 dated Sep. 5, 2017.
Final Office Action issued in corresponding U.S. Appl. No. 15/145,491 dated Sep. 6, 2017.
Non-Final Office Action issued in corresponding U.S. Appl. No. 14/881,535 dated Oct. 6, 2017.
Non-Final Office Action issued in corresponding U.S. Appl. No. 15/145,414 dated Nov. 29, 2017.
Non-Final Office Action issued in corresponding U.S. Appl. No. 15/644,487 dated Nov. 13, 2017.
Canadian Office Action dated Mar. 2, 2018 in related Canadian Patent Application No. 2,833,711.
Office Action dated Apr. 10, 2018 in related U.S. Appl. No. 15/294,349.
Office Action dated Apr. 2, 2018 in related U.S. Appl. No. 15/183,387.
Office Action dated May 29, 2018 in related U.S. Appl. No. 15/235,716.
Candian Office Action dated Apr. 18, 2018 in related Canadian Patent Application No. 2,928,711.
Canadian Office Action dated Jun. 22, 2018 in related Canadian Patent Application No. 2,886,697.
Office Action dated Jul. 25, 2018 in related U.S. Appl. No. 15/644,487.
Office Action dated Oct. 4, 2018 in related U.S. Appl. No. 15/217,081.
International Search Report and Written Opinion dated Sep. 19, 2018 in related PCT Patent Application No. PCT/US2018/040683.
Canadian Office Action dated Sep. 28, 2018 in related Canadian Patent Application No. 2,945,281.
Office Action dated Dec. 12, 2018 in related U.S. Appl. No. 16/160,708.
International Search Report and Written Opinion dated Jan. 2, 2019 in related PCT Patent Application No. PCT/US18/54542.
International Search Report and Written Opinion dated Jan. 2, 2019 in related PCT Patent Application No. PCT/US18/54548.
International Search Report and Written Opinion dated Dec. 31, 2018 in related PCT Patent Application No. PCT US18/55913.
International Search Report and Written Opinion dated Jan. 4, 2019 in related PCT Patent Application No. PCT/US18/57539.
Non-Final Office Action dated Feb. 12, 2019 in related U.S. Appl. No. 16/170,695.
International Search Report and Written Opinion dated Feb. 15, 2019 in related PCT Patent Application No. PCT/US18/63977.
International Search Report and Written Opinion dated Mar. 5, 2019 in related PCT Patent Application No. PCT/US18/63970.
Non-Final Office Action dated Feb. 25, 2019 in related U.S. Appl. No. 16/210,749.
Non-Final Office Action dated Mar. 6, 2019 in related U.S. Appl. No. 15/183,387.
Office Action dated Jan. 30, 2019 in related Canadian Patent Application No. 2,936,997.
Office Action dated Mar. 1, 2019 in related Canadian Patent Application No. 2,943,275.
International Search Report and Written Opinion dated Apr. 10, 2019 in corresponding PCT Application No. PCT/US2019/016635.
Notice of Allowance dated Apr. 23, 2019 in corresponding U.S. Appl. No. 15/635,028.
International Search Report and Written Opinion dated Jul. 9, 2019 in corresponding PCT Application No. PCT/US2019/027584.
International Search Report and Written Opinion dated Jan. 2, 2020 in related PCT Application No. PCT/US19/55325.
Notice of Allowance dated Jan. 9, 2020 in related U.S. Appl. No. 16/570,331.
Non-Final Office Action dated Dec. 23, 2019 in related U.S. Appl. No. 16/597,008.
Non-Final Office Action dated Mar. 3, 2020 in related U.S. Appl. No. 16/152,695.
Non-Final Office Action dated Dec. 6, 2019 in related U.S. Appl. No. 16/564,186.
International Search Report and Written Opinion dated Nov. 26, 2019 in related PCT Application No. PCT/US19/51018.
International Search Report and Written Opinion dated Feb. 11, 2020 in related PCT Application No. PCT/US2019/055323.
Final Office Action dated Mar. 31, 2020 in related U.S. Appl. No. 15/356,436.
Non-Final Office Action issued in corresponding U.S. Appl. No. 16/170,695 dated Jun. 7, 2019.
Non-Final Office Action issued in corresponding U.S. Appl. No. 16/268,030 dated May 10, 2019.
Final Office Action issued in corresponding U.S. Appl. No. 16/210,749 dated Jun. 11, 2019.
Canadian Office Action dated May 30, 2019 in corresponding CA Application No. 2,833,711.
Canadian Office Action dated Jun. 20, 2019 in corresponding CA Application No. 2,964,597.
International Search Report and Written Opinion dated Jul. 9, 2019 in related PCT Application No. PCT/US2019/027584.
Office Action dated Jun. 7, 2019 in related U.S. Appl. No. 16/268,030.
International Search Report and Written Opinion dated Sep. 11, 2019 in related PCT Application No. PCT/US2019/037493.
Office Action dated Aug. 19, 2019 in related U.S. Appl. No. 15/356,436.
Office Action dated Oct. 2, 2019 in related U.S. Appl. No. 16/152,732.
Office Action dated Sep. 11, 2019 in related U.S. Appl. No. 16/268,030.
Office Action dated Oct. 11, 2019 in related U.S. Appl. No. 16/385,070.
Office Action dated Sep. 3, 2019 in related U.S. Appl. No. 15/994,772
Office Action dated Sep. 20, 2019 in related U.S. Appl. No. 16/443,273.
Oanadian Office Action dated Oct. 1, 2019 in related Canadian Patent Application No. 2,936,997.
Office Action dated Dec. 6, 2019 in related U.S. Appl. No. 16/564,186.
International Search Report and Written Opinion dated Jun. 2, 2020 in corresponding PCT Application No. PCT/US20/23809.
International Search Report and Written Opinion dated Jun. 23, 2020 in corresponding PCT Application No. PCT/US20/23912.
International Search Report and Written Opinion dated Jul. 22, 2020 in corresponding PCT Application No. PCT/US20/00017.
Office Action dated Aug. 4, 2020 in related U.S. Appl. No. 16/385,070.
Office Action dated Jun. 29, 2020 in related U.S. Appl. No. 16/404,283.
Office Action dated Jun. 29, 2020 in related U.S. Appl. No. 16/728,359.
Office Action dated Jun. 22, 2020 in related U.S. Appl. No. 16/377,861.
Canadian Office Action dated Aug. 18, 2020 in related CA Patent Application No. 2,933,444.
Canadian Office Action dated Aug. 17, 2020 in related CA Patent Application No. 2,944,968.
Non-Final Office dated Oct. 26, 2020 in U.S. Appl. No. 15/356,436.
Non-Final Office dated Oct. 5, 2020 in U.S. Appl. No. 16/443,273.
Non-Final Office Action dated Sep. 29, 2020 in U.S. Appl. No. 16/943,727.
Non-Final Office Action dated Sep. 2, 2020 in U.S. Appl. No. 16/356,263.
Non-Final Office Action dated Aug. 31, 2020 in U.S. Appl. No. 16/167,083.
Albone, "Mobile Compressor Stations for Natural Gas Transmission Service," ASME 67-GT-33, Turbo Expo, Power for Land, Sea and Air, vol. 79887, p. 1-10, 1967.
Canadian Office Action dated Sep. 22, 2020 in Canadian Application No. 2,982,974.
International Search Report and Written Opinion dated Sep. 3, 2020 in PCT/US2020/36932.

(56) References Cited

OTHER PUBLICATIONS

"Process Burner" (https://www.cebasrt.com/productsloii-gaslprocess-bumer)06 Sep. 6, 2018 (Sep. 6, 2018), entire document, especially para (Burners for refinery Heaters].
Water and Glycol Heating Systems• (https://www.heat-inc.com/wg-series-water-glycol-systems/) Jun. 18, 2018 (Jun. 18, 2018), entire document, especially WG Series Water Glycol Systems.
"Heat Exchanger" (https://en.wiklpedia.org/w/index.php?title=Heat_exchanger&oldid=89300146) Dec. 18, 2019 Apr. 2019 (Apr. 18, 2019), entire document, especially para (0001].
Canadian Office Action dated Sep. 8, 2020 in Canadian Patent Application No. 2,928,707.
Canadian Office Action dated Aug. 31, 2020 in Canadian Patent Application No. 2,944,980.
International Search Report and Written Opinion dated Aug. 28, 2020 in PCT/US20/23821.
International Search Report and Written Opinion mailed in PCT/US20/67526 dated May 6, 2021.
International Search Report and Written Opinion mailed In PCT/US20/67608 dated Mar. 30, 2021.
International Search Report and Written Opinion mailed In PCT/US20/67528 dated Mar. 19, 2021.
International Search Report and Written Opinion mailed in PCT/US20/67146 dated Mar. 29, 2021.
International Search Report and Written Opinion mailed in PCT/US20/67523 dated Mar. 22, 2021.
International Search Report and Written Opinion mailed in PCT/US2020/066543 dated May 11, 2021.
Morris et al., U.S. Appl. No. 62/526,869; Hydration-Blender Transport and Electric Power Distribution for Fracturing Operation; Jun. 28, 2018; USPTO; see entire document.
Final Office Action dated Feb. 4, 2021 in U.S. Appl. No. 16/597,014.
International Search Report and Written Opinion dated Feb. 4, 2021 in PCT/US20/59834.
International Search Report and Written Opinion dated Feb. 2, 2021 in PCT/US20/58906.
International Search Report and Written Opinion dated Feb. 3, 2021 in PCT/US20/58899.
Non-Final Office Action dated Jan. 29, 2021 in U.S. Appl. No. 16/564,185.
Final Office Action dated Jan. 21, 2021 in U.S. Appl. No. 16/458,696.
Final Office Action dated Jan. 11, 2021 in U.S. Appl. No. 16/404,283.
Non-Final Office Action dated Jan. 4, 2021 in U.S. Appl. No. 16/522,043.
International Search Report and Written Opinion dated Dec. 14, 2020 in PCT/US2020/53980.
Non-Final Office Action issued in U.S. Appl. No. 16/871,928 dated Aug. 25, 2021.
Non-Final Office Action issued in U.S. Appl. No. 16/943,727 dated Aug. 3, 2021.
Non-Final Office Action issued in U.S. Appl. No. 14/881,525 dated Jul. 21, 2021.
Non-Final Office Action issued in U.S. Appl. No. 16/404,283 dated Jul. 21, 2021.
Notice of Allowance and Notice of Allowability issued in U.S. Appl. No. 15/829,419 dated Jul. 26, 2021.
Woodbury et al., "Electrical Design Considerations for Drilling Rigs," IEEE Transactions on Industry Applications, vol. 1A-12, No. 4, Jul./Aug. 1976, pp. 421-431.

\* cited by examiner

MODULAR SWITCHGEAR SYSTEM AND POWER DISTRIBUTION FOR ELECTRIC OILFIELD EQUIPMENT

CROSS REFERENCE TO RELATED APPLICATIONS

This application claims priority to and the benefit of U.S. Provisional Application Ser. No. 62/743,299 filed Oct. 9, 2018 titled "MODULAR SWITCHGEAR SYSTEM AND POWER DISTRIBUTION FOR ELECTRIC OILFIELD EQUIPMENT," and U.S. Provisional Application Ser. No. 62/743,360 filed Oct. 9, 2018 titled "Electric Powered Hydraulic Fracturing Pump System with Single Electric Quintuplex Fracturing Trailers," the full disclosures of which are hereby incorporated herein by reference in their entirety for all purposes.

BACKGROUND

1. Technical Field

This disclosure relates generally to hydraulic fracturing and more particularly to systems and methods for module switchgear and power distribution systems.

2. Background

With advancements in technology over the past few decades, the ability to reach unconventional sources of hydrocarbons has tremendously increased. Horizontal drilling and hydraulic fracturing are two such ways that new developments in technology have led to hydrocarbon production from previously unreachable shale formations. Hydraulic fracturing (fracturing) operations typically require powering numerous components in order to recover oil and gas resources from the ground. For example, hydraulic fracturing usually includes pumps that inject fracturing fluid down the wellbore, blenders that mix proppant into the fluid, cranes, wireline units, and many other components that all must perform different functions to carry out fracturing operations.

Usually in fracturing systems the fracturing equipment runs on diesel-generated mechanical power or by other internal combustion engines. Such engines may be very powerful, but have certain disadvantages. Diesel is more expensive, is less environmentally friendly, less safe, and heavier to transport than natural gas. For example, heavy diesel engines may require the use of a large amount of heavy equipment, including trailers and trucks, to transport the engines to and from a wellsite. In addition, such engines are not clean, generating large amounts of exhaust and pollutants that may cause environmental hazards, and are extremely loud, among other problems. Onsite refueling, especially during operations, presents increased risks of fuel leaks, fires, and other accidents. The large amounts of diesel fuel needed to power traditional fracturing operations requires constant transportation and delivery by diesel tankers onto the well site, resulting in significant carbon dioxide emissions.

Some systems have tried to eliminate partial reliance on diesel by creating bi-fuel systems. These systems blend natural gas and diesel, but have not been very successful. It is thus desirable that a natural gas powered fracturing system be used in order to improve safety, save costs, and provide benefits to the environment over diesel powered systems. Turbine use is well known as a power source, but is not typically employed for powering fracturing operations.

Though less expensive to operate, safer, and more environmentally friendly, turbine generators come with their own limitations and difficulties as well. As is well known, turbines generally operate more efficiently at higher loads. Many power plants or industrial plants steadily operate turbines at 98% to 99% of their maximum potential to achieve the greatest efficiency and maintain this level of use without significant difficulty. This is due in part to these plants having a steady power demand that either does not fluctuate (i.e., constant power demand), or having sufficient warning if a load will change (e.g., when shutting down or starting up a factory process).

During fracturing operations, there may be a variety of cables, hoses, and the like extending across various locations at the well site. This may generate traffic or congestion, as routes and passages around the well site may be restricted or blocked off. Furthermore, operators may be confused when connecting or disconnecting equipment, as the large number of hoses, cables, and the like may be challenging to hook up to desired locations. Moreover, because space at the well site is at a premium, having numerous skids, trailers, and the like may present logistical challenges.

Therefore it may be desirable to devise a means by which turbine power generation can be managed at an output usable by fracturing equipment.

SUMMARY

Applicant recognized the problems noted above herein and conceived and developed embodiments of systems and methods, according to the present disclosure, for operating electric powered fracturing pumps.

The present disclosure is directed to a method and system for a modular switchgear system and power distribution for electric oilfield equipment.

In an embodiment, systems of the present disclosure mount transformers directly on a pump trailer.

In an embodiment, a liquid cooling system, such as a radiator, is provided for cooling one or more variable frequency drives (VFDs) used to regulate an electric powered pump. In various embodiments, the cooling system is on a gooseneck of a trailer and enables liquid cooling of the VFD.

In an embodiment, a gooseneck trailer receives a variety of oilfield and switchgear equipment and includes a ladder and handrails on the gooseneck portion to enable direct access to a transformer.

In an embodiment, the gooseneck of the trailer includes a roller system to enable operators to smoothly pull cables onto the gooseneck without damaging the cables.

In an embodiment, a motor control center (MCC) is arranged on the gooseneck of the trailer within a perimeter established by the handrails with access via the ladder.

In various embodiments, the VFD and human machine interface (HMI) are on the same service platform, covered at least in part by a rain guard, to enable maintenance work and operations on the VFD with visuals of the pump controls.

In various embodiments, a single high voltage cable, for example a 13.8 kV cable, is run from the switchgear to the pumping unit because the transformer is mounted on the same platform as the VFD, MCC, and frac pump.

In an embodiment, a hydraulic fracturing system for fracturing a subterranean formation includes a support structure having a first area, a second area, a third area, and a fourth area arranged adjacent one another. The system also includes an electric powered pump, arranged in the first area, the electric powered pump coupled to a well associated with the subterranean formation and powered by at least one electric motor, also arranged in the first area, the electric powered pump configured to pump fluid into a wellbore associated with the well at a high pressure so that the fluid passes from the wellbore into the subterranean formation and fractures the subterranean formation. The system further includes a variable frequency drive (VFD), arranged in the second area proximate the first area, connected to the at least one electric motor to control the speed of the at least one electric motor. The system includes a transformer, arranged in the third area proximate the second area, the transformer positioned within an enclosure, the transformer distributing power to the electric powered pump, the power being received from at least one generator at a voltage higher than an operating voltage of the electric powered pump. The system also includes a cooling system, arranged in the fourth area proximate the third area, the cooling system providing a cooling fluid to the VFD via one or more headers.

It should be appreciated that the areas described herein refer to regions of a trailer or support structure that are particularly selected to receive one or more components that may be utilized with hydraulic fracturing operations. In various embodiments, the first, second, third, and fourth areas may be axially aligned along an axis of support structure. The recitation of the areas is not intended to be limiting, but rather, to designate various regions for clarity with the description.

In an embodiment, a hydraulic fracturing system for fracturing a subterranean formation includes at least one generator and at least one switchgear receiving electrical power from the generator. The system further includes an electric powered pump, arranged on a support structure in a first area, the electric powered pump coupled to a well associated with the subterranean formation and powered by at least one electric motor, also arranged in the first area, the electric powered pump configured to pump fluid into a wellbore associated with the well at a high pressure so that the fluid passes from the wellbore into the subterranean formation and fractures the subterranean formation. The system also includes a variable frequency drive (VFD), arranged on the support structure in a second area proximate the first area, connected to the at least one electric motor to control the speed of the at least one electric motor. The system further includes a transformer, arranged on the support structure in a third area proximate the second area, the transformer distributing power to the electric powered pump, the power being received from the least one generator at a voltage higher than an operating voltage of the electric pump.

The system includes a cooling system, arranged on the support structure in a fourth area proximate the third area, the cooling system providing a cooling fluid to at least the VFD.

In an embodiment, a hydraulic fracturing system for fracturing a subterranean formation includes a plurality of electric powered pumps coupled to a well associated with the subterranean formation and powered by at least one electric motor, the electric powered pump configured to pump fluid into a wellbore associated with the well at a high pressure so that the fluid passes from the wellbore into the subterranean formation and fractures the subterranean formation. The system also includes a variable frequency drive (VFD) connected to the at least one electric motor to control the speed of the at least one electric motor. The system further includes a transformer for distributing power to the electric powered pump, the power being received from at least one generator at a voltage higher than an operating voltage of the electric powered pump. The system also includes at least one switchgear, receiving power from at least one generator, configured to distribute power to a plurality of pieces of wellsite equipment, the at least two switchgears coupled by a tie breaker. In embodiments, the switchgear may refer to a single breaker. However, in other embodiments, the switchgear may refer to a trailer full of switchgear components, which may include multiple breakers. Accordingly, recitation of the single switchgear may refer to a single switchgear trailer.

BRIEF DESCRIPTION OF DRAWINGS

Some of the features and benefits of the present disclosure having been stated, others will become apparent as the description proceeds when taken in conjunction with the accompanying drawings, in which.

Figure 1:
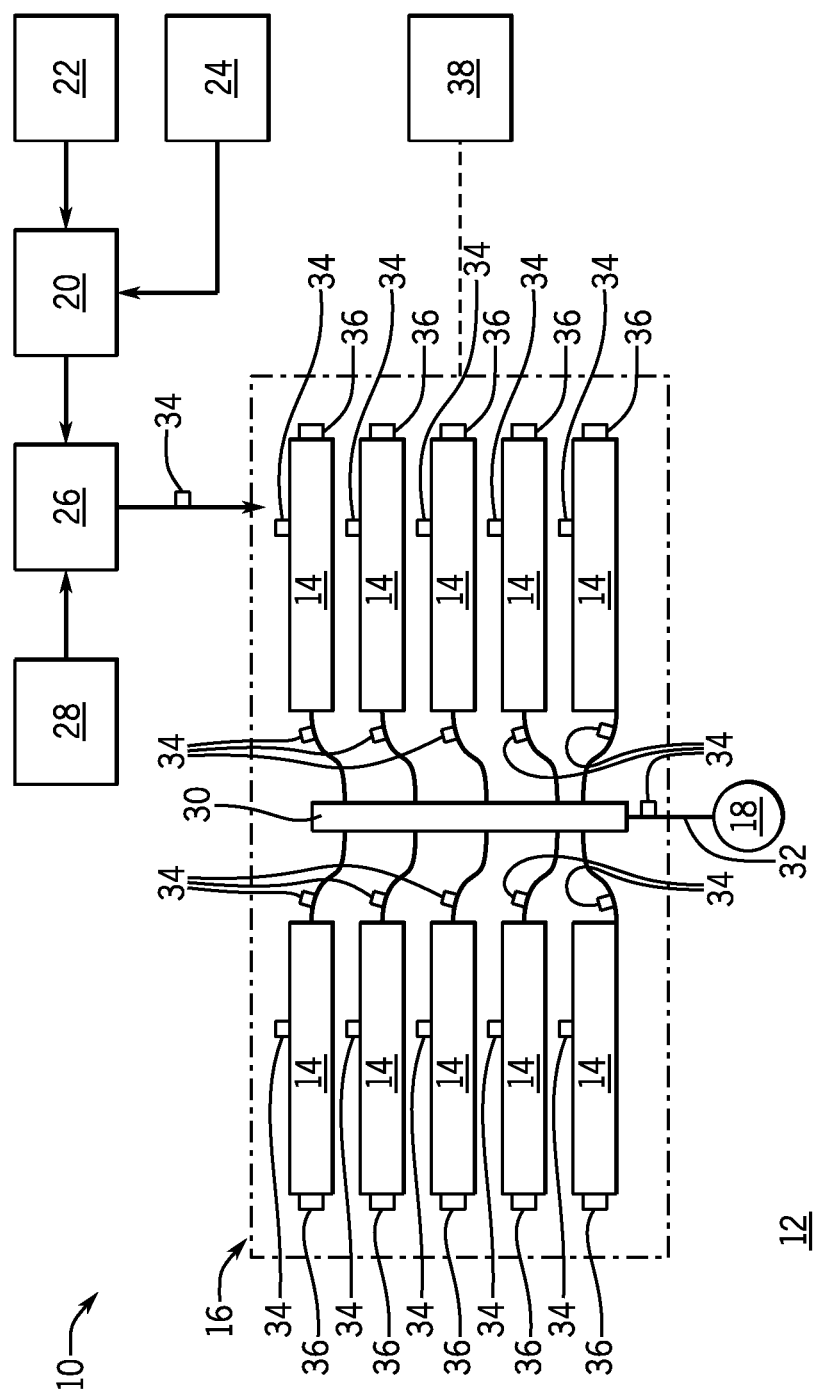
FIG. 1 is a schematic plan view of an embodiment of a fracturing operation, in accordance with embodiments of the present disclosure.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Additionally, recitations of steps of a method should be understood as being capable of being performed in any order unless specifically stated otherwise. Furthermore, the steps may be performed in series or in parallel unless specifically stated otherwise Embodiments of the present disclosure describe a switchgear unit that may act as a power hub by combining and/or consolidating power output from multiple electrical generators for collection and distribution to various pieces of equipment at a wellsite. For example, in embodiments, a switchgear unit may be trailer mounted and receive power output from one or more generators. The power output may be at a variety of different levels. Upon receipt, the switchgear may act as a hub for the power to other equipment.

In various embodiments, switchgear trailers may act as power hubs to combine the output of multiple electrical generators. Adding a tie breaker between two switchgear trailers can eliminate the need for a third switchgear trailer, while still retaining the ability to evenly distribute power between all of the equipment, and to concurrently evenly distribute the electrical load between a plurality of turbine generator sets.

In certain embodiments, the switchgear configurations described herein may selectively choose between either load sharing, to provide efficiency and flexibility; or having isolated banks of equipment, to provide protection and redundancy. In an embodiment, the switchgear optionally includes a tie breaker. The tie breaker can synchronize three-phase power of a similar voltage and frequency from different sources to act as a common bus, and can evenly distribute the electrical load between a plurality of electric pumps and turbine generators when the tie breaker is in a closed position. The tie breaker will isolate one or more of the plurality of electric powered pumps, the turbine generator, and the switchgear units when the tie breaker is in an open position. The use of a tie breaker can provide an advantage over previous load sharing systems because use of a tie breaker provides more options for the equipment operators and allows the fleet to be more versatile as to which mode of operation—protection and redundancy, or efficiency and flexibility—is more desirable at any given moment.

Embodiments of the present disclosure also include a pump trailer that includes a variety of different pieces of equipment mounted on a common trailer, thereby simplifying layouts at the well site and reducing a number of cables run between different pieces of equipment. In various embodiments, the trailer includes a plunger type fracturing pump with up to 15 plungers, electric motor for powering the pump, various lube oil systems, a transformer, a variable frequency drive (VFD), a cooler, and a control system. Accordingly, in embodiments, a single cable may be routed from the switchgear to the pump trailer, simplifying operations and reducing congestion at the well site.

FIG. 1 is a plan schematic view of an embodiment of a hydraulic fracturing system 10 positioned at a well site 12. In the illustrated embodiment, pump units 14, which make up a pumping system 16, are used to pressurize a slurry solution for injection into a wellhead 18. An optional hydration unit 20 receives fluid from a fluid source 22 via a line, such as a tubular, and also receives additives from an additive source 24. In an embodiment, the fluid is water and the additives are mixed together and transferred to a blender unit 26 where proppant from a proppant source 28 may be added to form the slurry solution (e.g., fracturing slurry) which is transferred to the pumping system 16. The pump units 14 may receive the slurry solution at a first pressure (e.g., 80 psi to 160 psi) and boost the pressure to around 15,000 psi for injection into the wellhead 18. In certain embodiments, the pump units 14 are powered by electric motors.

After being discharged from the pump system 16, a distribution system 30, such as a missile, receives the slurry solution for injection into the wellhead 18. The distribution system 30 consolidates the slurry solution from each of the pump units 14 and includes discharge piping 32 coupled to the wellhead 18. In this manner, pressurized solution for hydraulic fracturing may be injected into the wellhead 18.

In the illustrated embodiment, one or more sensors 34, 36 are arranged throughout the hydraulic fracturing system 10 to measure various properties related to fluid flow, vibration, and the like.

It should be appreciated that while various embodiments of the present disclosure may describe electric motors powering the pump units 14, in embodiments, electrical generation can be supplied by various different options, as well as hybrid options. Hybrid options may include two or more of the following electric generation options: Gas turbine generators with fuel supplied by field gas, CNG, and/or LNG, diesel turbine generators, diesel engine generators, natural gas engine generators, batteries, electrical grids, and the like. Moreover, these electric sources may include a single source type unit or multiple units. For example, there may be one gas turbine generator, two gas turbines generators, two gas turbine generators coupled with one diesel engine generator, and various other configurations.

In various embodiments, equipment at the well site may utilize 3 phase, 60 Hz, 690V electrical power. However, it should be appreciated that in other embodiments different power specifications may be utilized, such as 4160V or at different frequencies, such as 50 Hz. Accordingly, discussions herein with a particular type of power specification should not be interpreted as limited only the particularly discussed specification unless otherwise explicitly stated. Furthermore, systems described herein are designed for use in outdoor, oilfield conditions with fluctuations in temperature and weather, such as intense sunlight, wind, rain, snow, dust, and the like. In embodiments, the components are designed in accordance with various industry standards, such as NEMA, ANSI, and NFPA.

Figure 2:
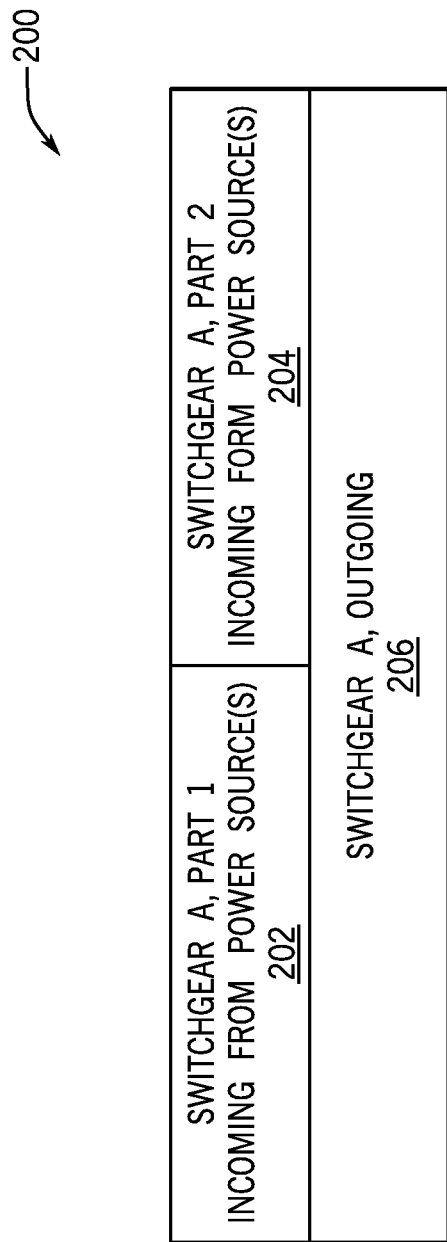
FIG. 2 is a block diagram of an embodiment of a switchgear unit, in accordance with embodiments of the present disclosure.

FIG. 2 is a block diagram of an embodiment of a switchgear unit 200 that includes a first part 202, a second part 204, and a third part 206. As illustrated, the first part 202 and the second part 204 may receive incoming power from one or more power sources. These power sources may include any of the power sources described above, such as gas turbines, diesel generators, and the like. The switchgear unit 200 also includes the third part 206, which is utilized to output energy to various pieces of equipment at the wellsite.

Embodiments of the present disclosure include the switchgear unit 200 configured to enable capability for a variety of configurations. A non-limiting example includes: one 30 MW, 60 hz, 13,800 VAC natural gas turbine generator; one 30 MW, 60 hz, 13,800 VAC natural gas turbine generator and one 5.67 MW, 60 hz, 13,800 VAC natural gas turbine generator; one 30 MW, 60 hz, 13,800 VAC natural gas turbine generator and two 5.67 MW, 60 hz, 13,800 VAC natural gas turbine generators; one 5.67 MW, 60 hz, 13,800 VAC natural gas turbine generator; two 5.67 MW, 60 hz, 13,800 VAC natural gas turbine generators; three 5.67 MW, 60 hz, 13,800 VAC natural gas turbine generators; four 5.67 MW, 60 hz, 13,800 VAC natural gas turbine generators; and two 30 MW, 60 hz, 13,800 VAC natural gas turbine generators.

As noted above, a variety of different configurations may be utilized along with the switchgear unit in order to provide operational power at the well site. For example, the first part 202 may be configured to receive one or more options from the list including, but not limited to: one 30 MW generator, one 5.67 MW generator, two 5.67 MW generators, or a blank (null-no input). Similarly, in embodiments, the second part 204 may be configured to receive one or more options from the list including, but not limited to: one 30 MW generator, one 5.67 MW generator, two 5.67 MW generators, or a blank (null-no input). It should be appreciated that the first and second parts 202, 204 may be differently configured in various embodiments, such as one including the 30 MW generator input while the other includes the 5.67 MW generator input, by way of non-limiting example.

The third part 206 may be referred to as the outgoing side of the switchgear unit 200 and can connection electrically to a variety of equipment types, such as power distribution systems to transmit power long distances (e.g., 2 miles or farther); other switchgears; transformers; and the like.

In various embodiments, the switchgear unit 200 can be trailer mounted, skid mounted, bodyload mounted, or mounted on another type of platform. Furthermore, the switchgear unit 200 can be separate or combined with other equipment described herein, such as the pump units.

Figure 3:
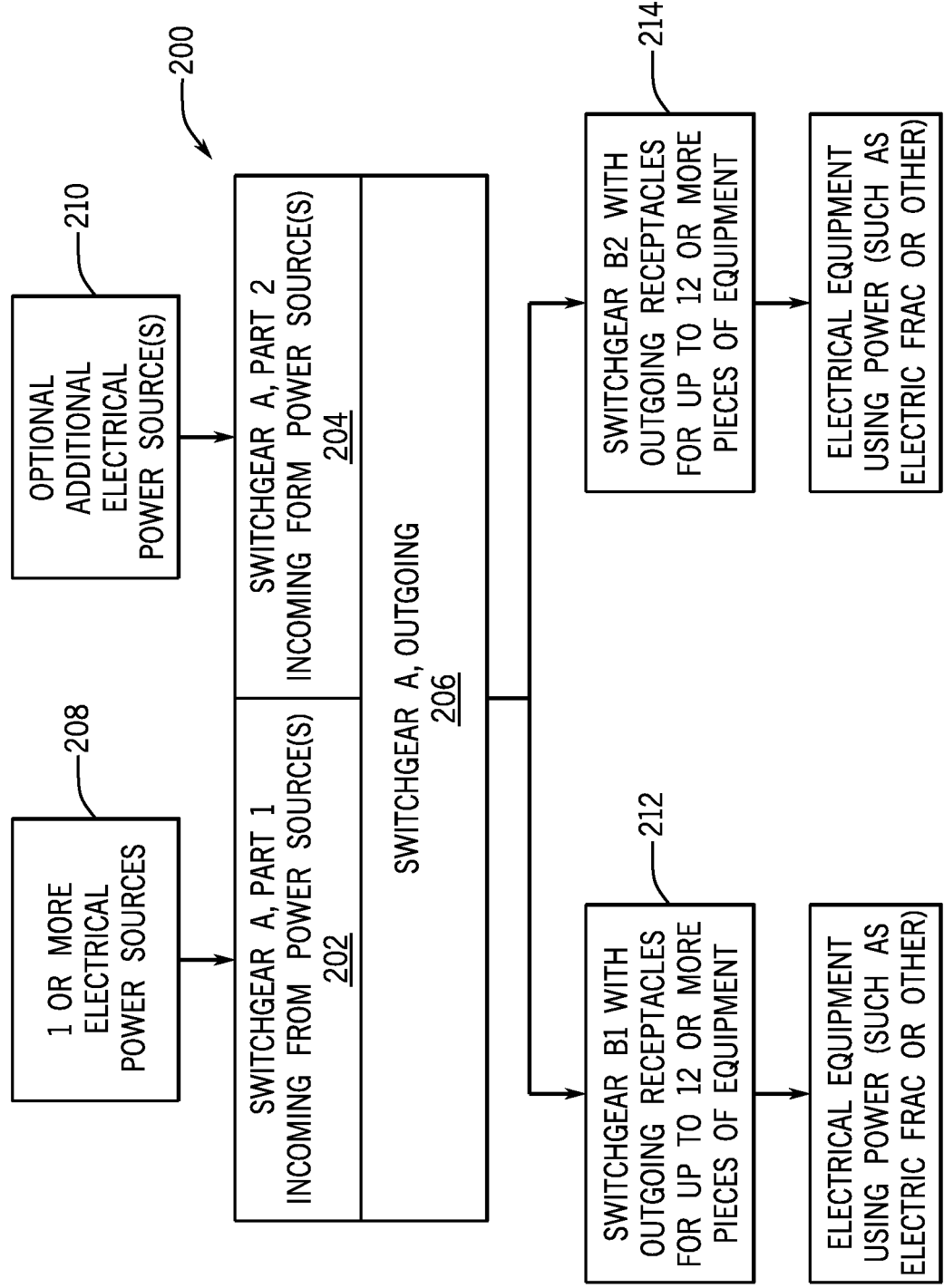
FIG. 3 is a block diagram of an embodiment of a switchgear system, in accordance with embodiments of the present disclosure.

FIG. 3 is a block diagram of an embodiment of a configuration of the switchgear unit 200. In the illustrated embodiment, power sources 208, 210 are coupled to the first part 202 and the second part 204, respectively. It should be appreciated that while a single block is illustrated, in embodiments the power sources 208, 210 may include one or more different or similar types of power generation equipment. For example, multiple different power sources may be coupled to a single switchgear part 202, 204. The third part 206 is illustrated as routing power to a first switch gear 212 and a second switchgear 214. However, it should be appreciated that, in various embodiments, the third part 206 may transmit power to other types of equipment. The illustrated first and second switchgears 212, 214 thereafter transmit power to electrical equipment, such as electric powered pumps, wireline, and the like. The first and second switchgears 212, 214 each include twelve (12) outlets in the illustrated embodiment, however it should be appreciated that more or fewer outlets may be utilized. Furthermore, not all outlets may be used at one time.

In embodiments, the switchgear unit 200, along with the first and second switchgears 212, 214 may be referred to as a switchgear system and may be trailer mounted. The system may be combined into a single unit or broken out into multiple units, such as in FIG. 3. Components can also be combined with other blocks such as combining switchgear functions onto an electrical power source such as a turbine generator as long as they are in electrical communication with each other. In this embodiment, switchgear unit 200 and the first and second switchgears 212, 214 are in electrical communication using power cables.

In various embodiments, the illustrated switchgear system is utilized for 13.8 kV operating voltages and includes, by way of example only, vacuum circuit breakers designed in accordance with ANSI and IEEE standards for metal enclosed switchgear rated as follows: Maximum voltage (RMS): 13.9 kV; ANSI Rating Basis: MVA rated; Operating Voltage 13.8 kV; Short Circuit Current Rating: 25 KA; Close voltage: 125 VDC; and Trip Voltage: 125 VDC.

The vertical section(s) of switchgear, may include the following common features: outdoor, non-walk-in enclosure, steel; basic ONE high construction; hinged front compartment doors with custom punching; 1200 A main bus, silver plated copper, 3 phase, 3 wire; flame retardant and track resistant bus insulation system; molded insulation cover boots at bus joints with removable non-metallic hardware; ground bus, ¼×2, tin plated copper; enclosure space heater with expanded metal cage, rate 240 VAC: powered coat paint finish; and ANSI-61, light gray interior and exterior. It should be appreciated that in various embodiments the switchgear may also include a 3000 A and/or a 2000 A bus work.

In embodiments, the system may include main bus voltage monitoring. Moreover, the system may include AC control power equipment that includes, by way of example: circuit breaker cell rated 200 A; silver plated copper runback bus assembly rated 200 A; fixed mount vacuum circuit breaker rated 600 A, 13.8 kV, 25 KA; digital overcurrent protective relay; fixed mounted assembly; secondary molded case circuit breaker; fixed mounted CPT, 15 kVA, 13800-208/120V, three phased with required primary fuses;

In embodiments, the system also includes main Circuit breakers, with each set including: circuit breaker cell rated 600 A; silver plated copper runback bus assembly rated 600 A; fixed mounted circuit breaker rated 600 A, 13.8 kV, 25 KA (Mains); digital overcurrent protective relay; lock-out relay; pilot lights, red, green, and amber; and incoming line Earthing Switch.

In various embodiments, each switchgear trailer also contains platform decking and handrails meeting OSHA safety standards, mounted on the gooseneck of the trailer.

The combined overall switchgear package for the entire spread may distribute electrical power between the following example list of hydraulic fracturing equipment: 22 electric powered hydraulic fracturing pumps with a transformer (it should be appreciated that 22 is for example purposes only and more or fewer pumps may be included), 2500 kVA, (13.800 V primary to 690 V secondary) and one 3000 HP AC Motor. Other embodiments of the electric powered hydraulic fracturing pumps can include dual hydraulic fracturing pumps (more than one pump, one or more motors), plunger type pumps with up to 15 plungers, intensifier pumps, and other forms of pumping frac slurry into a well that require electrical power. A non-limiting example of equipment includes electric pump down pumps; wire line; lights for the site; water transfer pump; electric crane; auxiliary power; electric blender; electric data van; electric hydration; electric chemical add; electric dry chem add; electric sand equipment; electric dust/silica mitigation equipment; black start generators; gas compressors; and filtration systems.

In various embodiments, a single electric powered multi-plunger pump fracturing trailer is capable of pumping inhibited acid and other proppant laden stimulation fluids and is remotely operated from a control unit. The single electric motor is capable of delivering 3,000 BHP or approximately 2500 HHP based on efficiency losses, pump limitations, and varying conditions at time of operations. While delivering full horsepower without exceeding the pump ratings, components will not vibrate with excessive amplitudes (e.g., amplitudes above a threshold) in resonance with the forcing vibrations of the electric motor or pump. Also, there are no or substantially no excessive rotational vibrations (e.g., vibrations above a threshold) of electric motor or pump due to transmitted torque and the flexibility of the trailer and mounting systems. The VFD system is installed on the trailer in various embodiments illustrated herein. The unit is capable of operating during prolonged pumping operations. The unit may operate in temperature ranges of −40° C. to 55° C.

Figure 4:
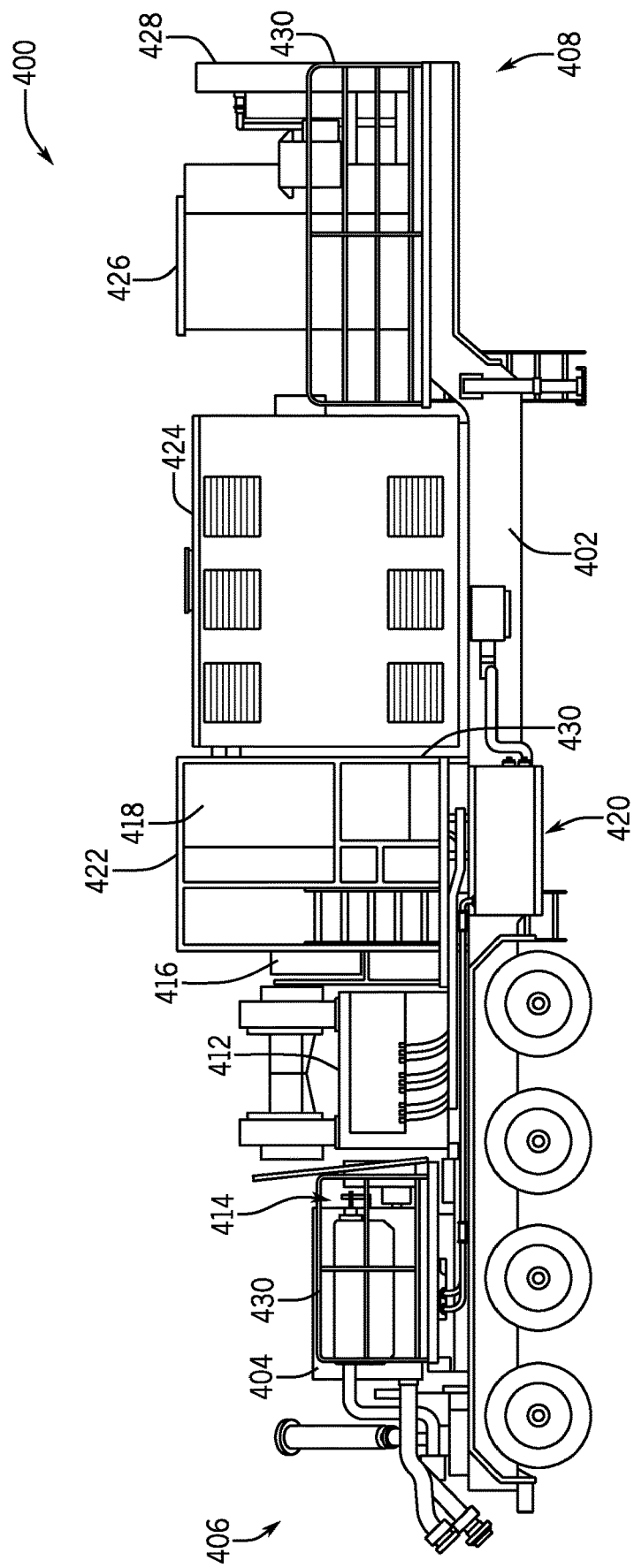
FIG. 4 is a side elevational view of an embodiment of a pumping trailer, in accordance with embodiments of the present disclosure.

FIG. 4 illustrates a side elevational view of an embodiment of a pumping trailer 400 for use at hydraulic fracturing sites. The illustrated pumping trailer 400 includes a trailer 402, which is a gooseneck trailer in the illustrated embodiment. In various embodiments, the trailer 402 is a heavy-duty single drop trailer that includes heavy-duty twin beam construction; 52" king pin setting; landing legs rated for 160.000 lbs; air ride suspension; heady-duty tri or quad axle configuration; ABS brakes, air type; 11.00 R 22.5 radial tires; 2" SAE king pin with rub plate; light mounted stop/turn clearance: mud flaps; rear bumper with tow hook; running lights for highway use; front and rear fenders; and the like.

As illustrated, in various embodiments, the trailer 402 is sized to accommodate a variety of different pieces of equipment. Advantageously, mounting the equipment to a single trailer 402 facilitates mobilization and demobilization between well sites. Moreover, the configuration may enable hard-piping or coupling various pieces of equipment before arriving at the well site, thereby reducing time. Additionally, the configuration illustrated in FIG. 4 may reduce congestion at the well site. It should be appreciated that inclusion of a trailer is for illustrative purposes only and that the components may also be mounted on a skid, truck bed, flatbed trailer, or the like.

The illustrated embodiment further includes a multi-plunger pump 404, which may be an electric powered fracturing pump with up to 15 plungers. The pump is arranged at an end 406 of the trailer 402 opposite a gooseneck 408. As will be described below, the pump 404 includes inlet and outlet piping for receiving fluid at a low pressure and then directing high pressure fluid away from the pumping trailer 400. In various embodiments, the pump 404 is a multi-plunger type fracturing pump with up to 15 plungers with the following non-limiting features: stainless steel fluid end; main discharge connection; bleed connection; center gauge connection; and zoomie suction manifold. In embodiments, a 6" zoomie suction manifold (or appropriately designed suction manifold to feed all of the plungers within the pump) extends to the edge of the unit. The manifold terminates with two 6" winged union connections and includes two butterfly valves, or could have more unions and butterfly valves as appropriate to feed all of the plungers within the pump. A removable pulsation dampener is installed in the inlet side. The pump's rear discharge port is connected to the discharge manifold via 3" sub-connections. A 2" connection is installed on the pump center gauge opening and is utilized for the unit pressure transducer. The rear discharge manifold consists of a 3" lines and a 3" check valve. The rear discharge manifold extends to the back of the trailer. In the illustrated embodiment, an electronically powered grease pump system with pumping elements is installed to provide lubricant to the plungers. This system is equipped with a pump speed input to adjust lubrication timing based on speed. The power end of the pumps are lubricated by a hydraulic pump driven by an auxiliary electric motor. The power end lubrication system includes components such as relief valve, filters, instrumentation, plumbing, and lube oil reservoir.

The illustrated pump 404 is powered by an electric motor 412, in the embodiment shown in FIG. 4. The motor 412 is mounted proximate the pump 404 and coupled to the pump 404 via a coupling 414. In embodiments, the coupling utilized for connecting the electric motor 412 to the pump 404 does not exceed the manufacturer's recommended maximum angle under normal operation condition. The coupling 414 includes a guard with an access panel to enable the pump 404 to be turned without guard removal.

By way of example only, the motor 412 is a horizontal AC cage induction motor. The motor has the following example performance characteristics and features: 3000 HP, voltage 690V, 3 Phase, insulation Class H, form wound, single shaft, new oilfield hub installed, anti-condensation strip heater installed, 100 ohm Platinum RTD's installed on windings (2 per phase), and two cooling blower rated 15 hp, 3600 rpm, 460 V.

The illustrated trailer 402 further includes a slide out platform for servicing the pump 404 and motor 412, a human machine interface (HMI) 416, a variable frequency drive (VFD) 418, an HMI-VFD platform 420, a platform cover 422, a transformer 424, a transformer service platform, a motor control center (MCC) 426, a cooling system 428, and railings 430. Example configurations of various components are described below, however, are for illustrative purposes only and are not limiting.

The transformer 424 may include a 3,000 kVA step down transformer and associated electrical components mounted on the trailer 402. The 3,000 kVA step down transformer may include the following features: 3-phase 60 hertz, 80/80 degree C. rise. AA/FFA, 7.0 percent impedance with +/−ANSI Standard Tolerance, and phase relation Dyn1. The high voltage 13800 delta includes features such as 95 KV BIL, taps, and copper conductor. The low voltage 600Y/346 includes features such as 30 DV BIL, taps, and copper conduction. Other features include application, rectifier duty, 6 pulse, core/coil with HV to LV electrostatic shield and K-factor rating, monitoring with control power and temperature monitor, and interconnect cables from the switchgear to VFD with 545 DLO cables installed to connect the transformer system to the VFD. It should be appreciated that a 6 pulse VFD is an example, and other configurations would be 12 or 24 pulse. Moreover, as noted herein, the example settings provided are not intended to limit the scope of the disclosure, as design configurations may lead to modifications.

In embodiments, the transformer 424 includes an enclosure structure constructed and braced for portable movement with features including heavy-duty construction, copper ground bus, NEMA 3R (outdoor Ventilated), and primed with ANSI 61 paint finish.

The VFD system 418 is designed to meet the electrical ac drive requirements for electric frac trailers that utilize 3 phase, 60 hertz, 690 volt electrical power source. The system is built in accordance with NEMA, ANSI, and NFPA regulations. The system meets the harsh environmental conditions typically found in oilfields. The VFD 418 may include the following example settings: 650 V motor, drive current of 2429 A, overload rating of 110% for 60 sec, supply voltage of 690 V, 6 pulse, supply frequency of 60 HZ, inverter modules, and cooling system with water/glycol. Moreover, in various embodiments, example drives include the following: 2500 A circuit breaker with UVR trip coil, input line reactors, semiconductor fuses with blown-fuse switches, control components, liquid cooled rectifiers, 3 inverter IGBT modules, 3 SMPS modules, shielded ribbon cables, digital controller with parameter based operations and I/O board, door mounted HMI for setup, monitoring, and diagnostics. MV 3000 I/O panel, control power transformer, 24 V power supply, relays, indicating lights, and emergency stop push button. In various embodiments, the VFD 418 also includes welded stainless steel piping coolant headers with hose connections to the modules. However, it should be appreciated that other piping may be used, such as carbon steel or the like. Each module is connected to the supply and return headers with a ¾" hose and isolation valve. The VFD enclosure is an IP66 enclosure that may include two internal heat exchangers are supplied for removing heat form the air inside of the drive enclosure and four frames are supplied in the enclosure for power cabling, control cables, and piping. Moreover, the VFD enclosure is covered by a rain shield, which extends out over the service platform to protect the components from rain while being serviced. In embodiments, the unit has a dry type 3 phase, 60 HZ, power distribution transformer with 690 V primary, and 240/120 V secondary with taps.

In embodiments, the MCC control enclosure is an outdoor weather-proof enclosure. The structure is constructed and braced for portable movement and has features such as access panels, all external off unit connections wired to plug-in connectors accessible from outside, primed and finished painted inside and out. LED external lighting, cooling provided via liquid cooled radiator, and frac pump motor is hard wired on the unit.

By way of example, the MCC 426 is fed by a circuit breaker independent from the VFD circuits. The MCC 426 may include features such as one MCC, Seismic Zone 4, 400 A Main bus, Rating: 42,000 AIC, 600 V, 60 HZ, 3 phase, and 3 wire. Furthermore, there may be four size 1 full voltage non-reversing starters of 10 HP with hands off auto switch. Additionally, there may be 2 full voltage non-reversing starters of 25 HP with hands off auto switch. The MCC may also include one lighting panel, 150 A, with circuit breakers as required.

Supplied and installed on each of the pump discharge units is a 0-15,000 PSI pressure transducer with hammer union connections. The transducers are installed with a protective guard in various embodiments. Also, in embodiments, there is a single touchscreen display for local pump control. However, other pump control may also be included. In various embodiments, the unit comes installed with either Ethernet communications or RS-485 serial. It may also be equipped with wireless communications to sensors in lieu of cabled communication and sensor connections.

In various embodiments, the trailer 400 may also include an access hatch on the coupling guard, cable gland protection, check valve bracket support, spools for the frac cables, step grip tape on the handrails and ladder, grounding for the trailer, ladder/stair access with handrails, land gear crank, oil radiator bracket, power end tank temp sensor, fire extinguisher, slide out work platform to work on the pump, motor, and motor cooling blowers, slide out work platform has a safety hinged door to prevent falls, the VFD has over pressure trip wiring and wireless capabilities. Vic Clamps, transformer louver design large metal mesh filter to prevent dust/dirt intrusion, and load shedding (via intelligent pump control throttle control and other load responses).

Figure 5:
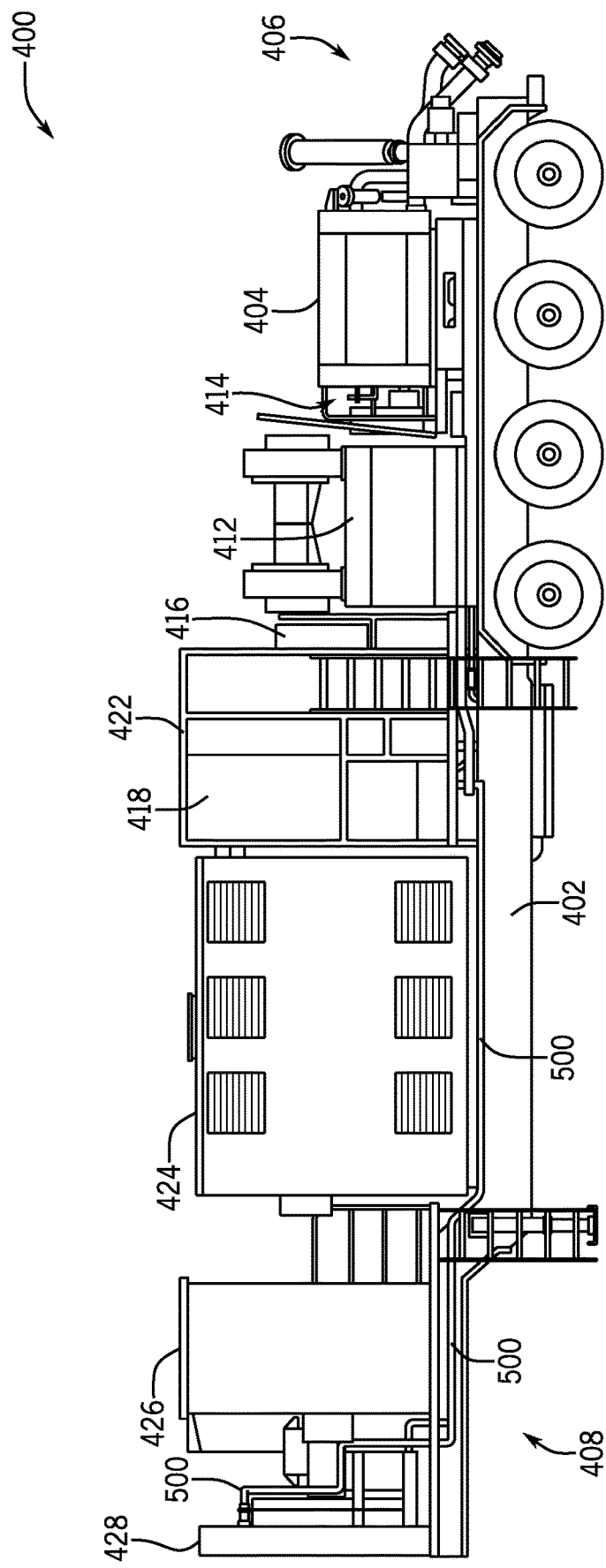
FIG. 5 is a side elevational view of an embodiment of a pumping trailer, in accordance with embodiments of the present disclosure.

FIG. 5 is a side view of an embodiment of the pump trailer 400. As illustrated, the pump 404 is arranged proximate the motor 412, which facilitates operation of the pump. The HMI 416 is arranged below the cover 422 and proximate the VFD 418 on the VFD platform 420. In the illustrated embodiment, the transformer 424 is arranged on the trailer 402, however it should be appreciated that in other embodiments the transformer 424 may be separately mounted, for example on a different trailer, skid, truck, or the like. The gooseneck 408 includes the cooling system 428 and MCC 426, in the illustrated embodiment. As described above, in various embodiments the VFD 418 is liquid cooled, for example via the headers 500 extending from the cooling system 428 to the VFD housing. The cooling system 428 may also be used to cool various other components.

Figure 6:
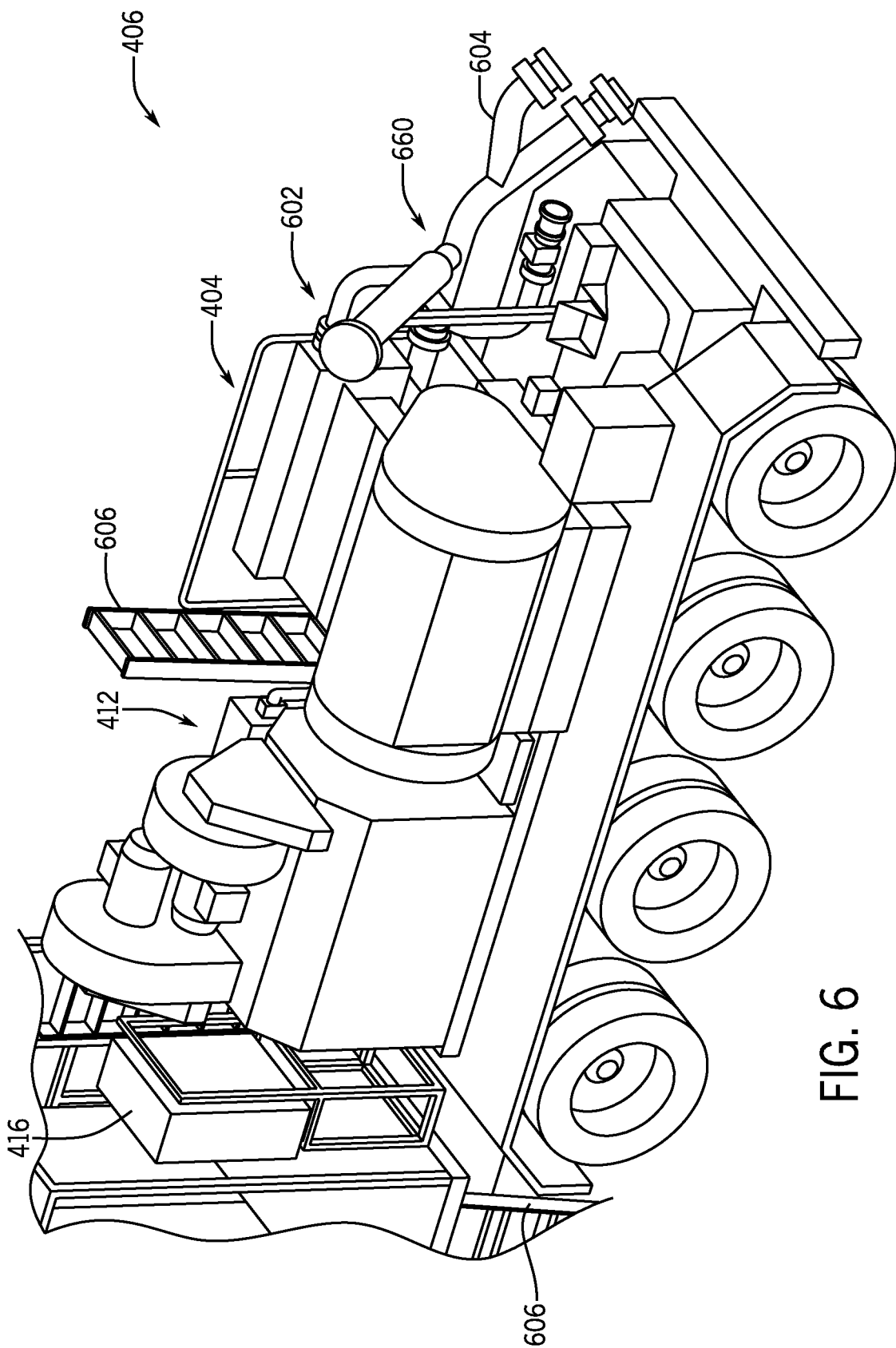
FIG. 6 is a perspective view of an embodiment of an end of a pumping trailer, in accordance with embodiments of the present disclosure.

FIG. 6 is a perspective view of an embodiment of the end 406 of the trailer 402 including the pump 404, motor 412, and partially including the VFD platform 420. In the illustrated embodiment, auxiliary systems described above are also illustrated. The pump 404 includes a suction end 600 and a discharge end 602. As shown in FIG. 6, piping 604 extends from the suction end 600 and the discharge end 602 to receive and direct fluid to and from the pumping trailer 400. It should be appreciated that various components, such as valves, couplings, sensors, and the like may be incorporated into the piping 604 and the end 406 of the trailer 402. In the illustrated embodiment, ladders 606 (shown in their stowed position) enable ingress and egress to various locations where maintenance operations may occur. Accordingly, operations utilizing the pumping trailer 400 may be easier for operators.

Figure 7:
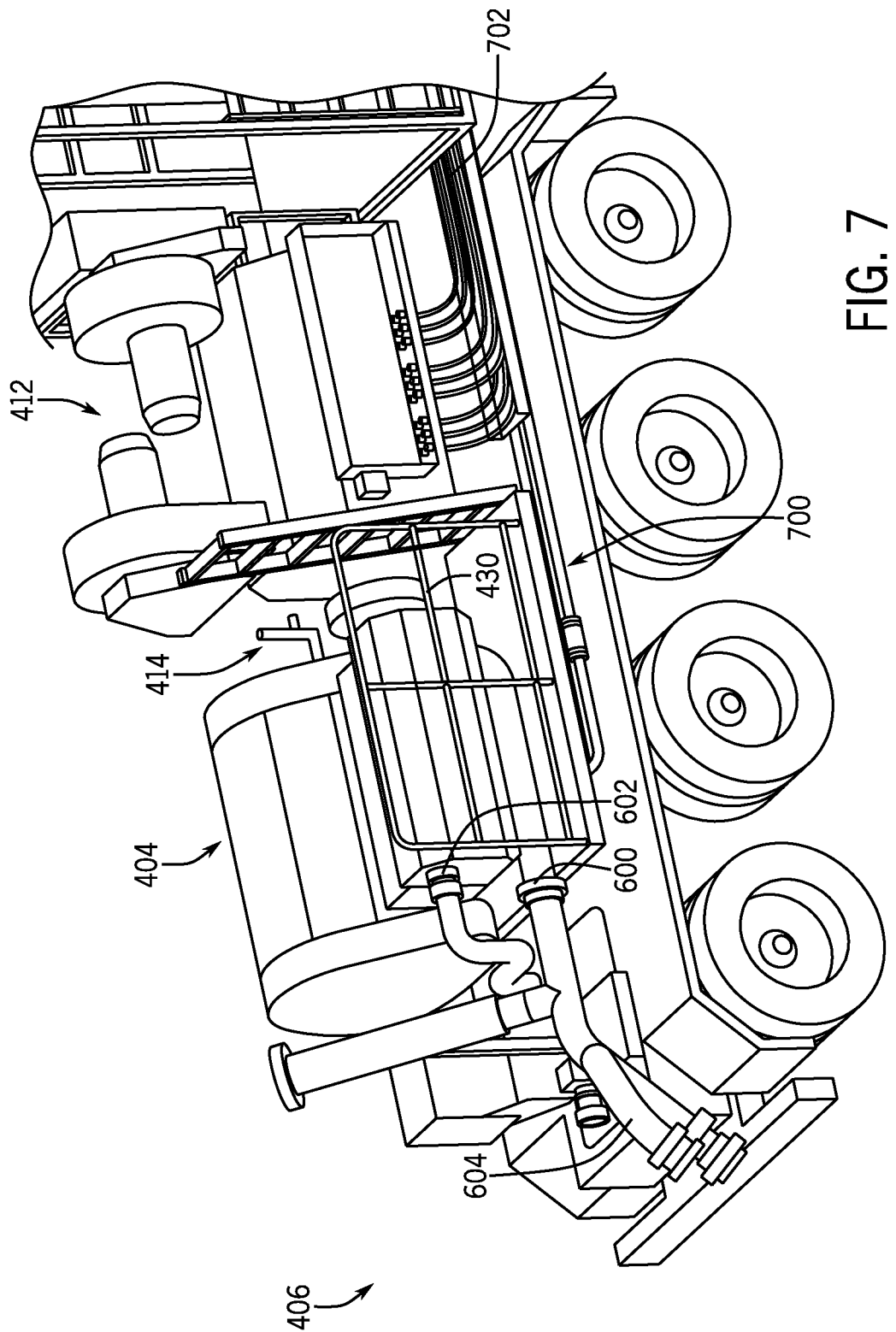
FIG. 7 is a perspective view of an embodiment of an end of a pumping trailer, in accordance with embodiments of the present disclosure.

FIG. 7 is a perspective view of an embodiment of the end 406 of the trailer 402. The illustrated embodiment includes the slide out platform 700, which is illustrated in a stored configuration. The illustrated handrail 430 may be used to side the platform 700 in and out, thereby facilitating maintenance operations on the pump 404. Sliding and storing the platform 700 enables a width of the trailer 402 to be reduced, which may reduce wide load permitting to transport the trailers between different locations. As illustrated, cabling 702 extending from the motor 412 is routed below the VFD platform 420, thereby reducing the likelihood the cabling 702 is disturbed. As will be appreciated, in various embodiments, because the components on the trailer 402 are substantially fixed relative to one another, the cabling and other connections may be made prior to arriving at the well site, thereby reducing time spent preparing for fracturing operations. Moreover, portions of the cabling and/or connections may be formed from stronger or more rigid materials because they will not be removed or may be moved less often than other cabling, which may be routed in different configurations at each well site.

Figure 8:
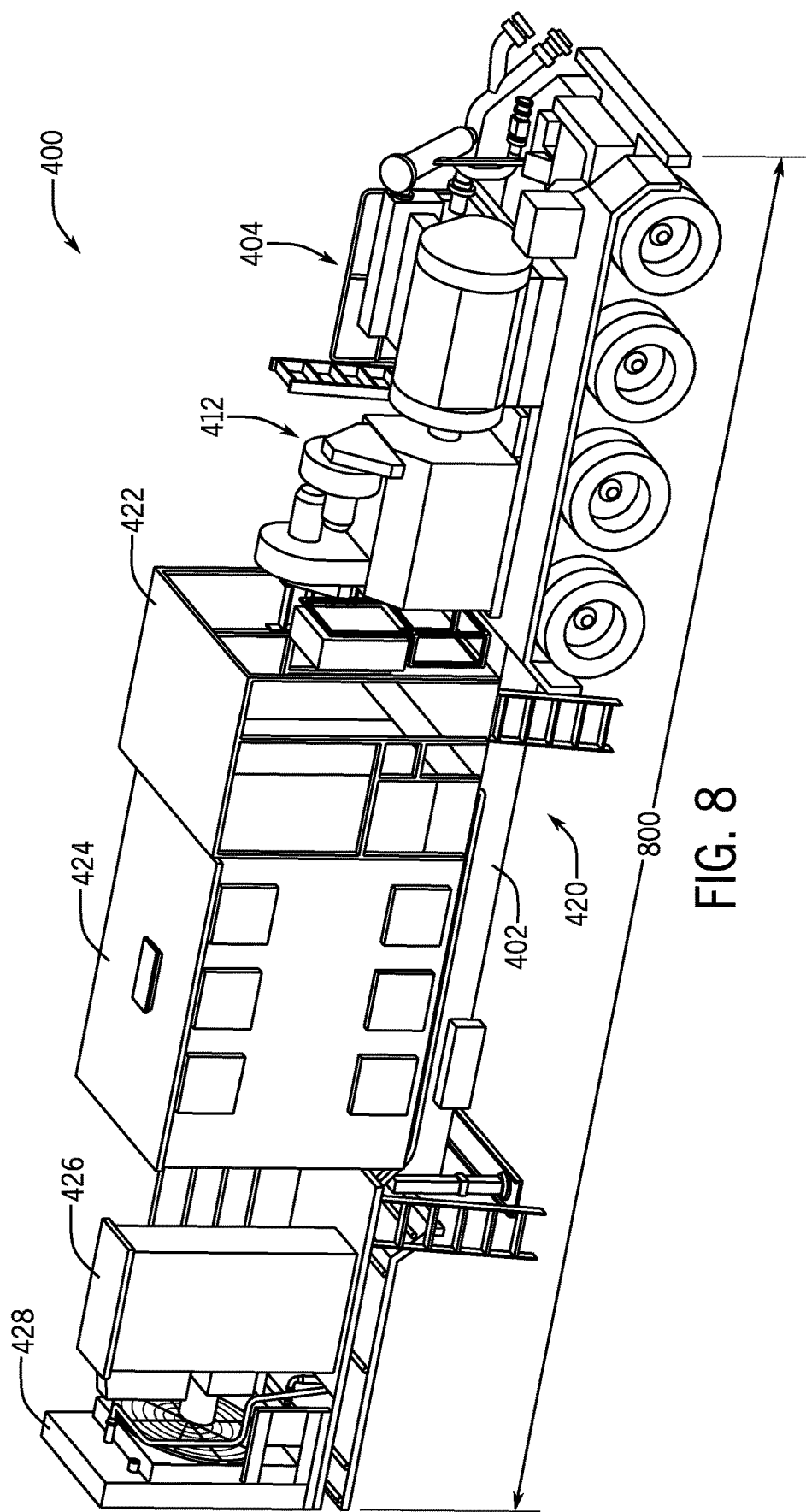
FIG. 8 is a perspective view of an embodiment of a pumping trailer, in accordance with embodiments of the present disclosure.

FIG. 8 is a perspective view of an embodiment of the pumping trailer 400. As described above, various components are arranged along a length 800 of the trailer 402. It should be appreciated that the illustrated ordering or relative positions of the components is for illustrative purposes only, and in other embodiments, components may be in different locations, as may be suitable for operating conditions. However, it may be advantageous to position components proximate to associated or operationally linked components. Moreover, arrangement configurations may be made with respect to expected maintenance operations.

Figure 9:
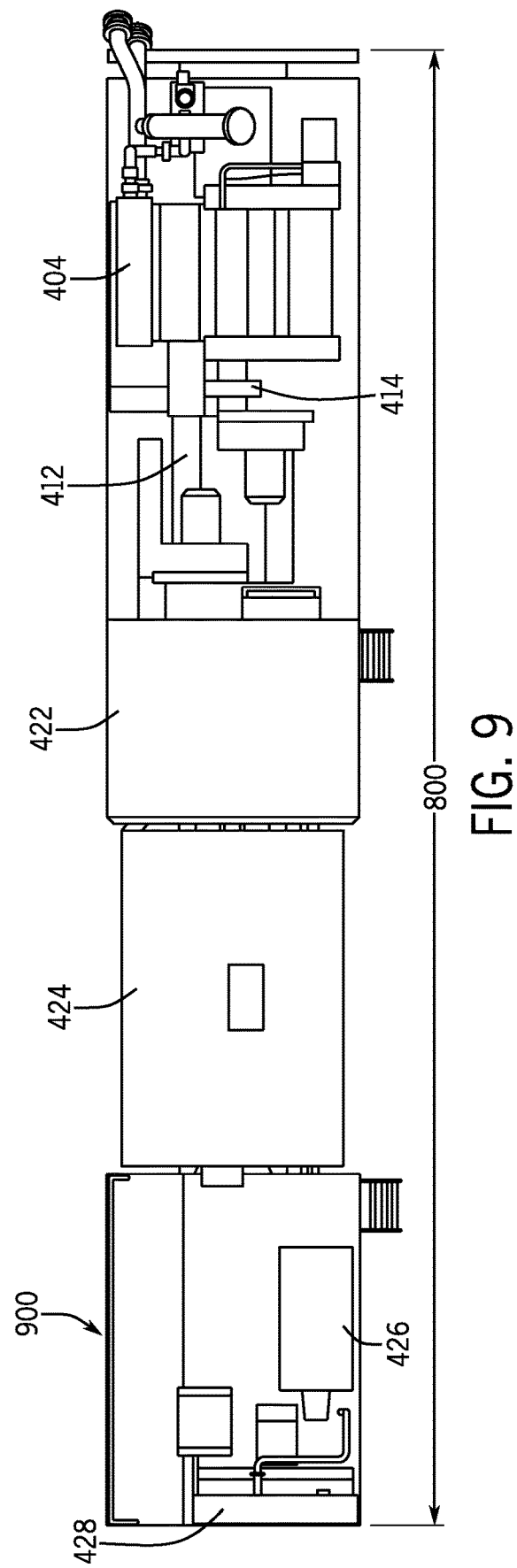
FIG. 9 is a top plan view of an embodiment of a pumping trailer, in accordance with embodiments of the present disclosure.

FIG. 9 is a top plan view of an embodiment of the trailer 402 further illustrating the configuration of the components along the length 800. As illustrated, a transformer service platform 900 provides space for operations to connect to the transformer 424, adjust operations using the MCC 426, and/or perform maintenance on the cooling system 428. The illustrated transformer service platform 900 is arranged on the gooseneck 408 and has a higher elevation, relative to the ground plane, than the VFD platform 420. As noted above, a relative width of the trailer 402 is substantially constant along the length 800, which may reduce requirements to get wide load permits for transportation along roadways. In various embodiments, similar slide or platforms, such as those described with respect to the platform 700, may further be integrated into other locations of the trailer 402 to facilitate pumping and/or maintenance operations.

In various embodiments, the trailer 402 may be referred to as having different areas or regions. However, such description is for illustrative purposes only and is not intended to limit the scope of the present disclosure. For example, a first area may be the region having the pump 404 and the motor 412. More, a second area may be the region having the VFD 418, which may be covered by the platform cover 422. Additionally, a third area may be region having the transformer 424 while the fourth area may be the region having the cooling system 428. It should be appreciated that, in various embodiments, these areas may partially or completely overlap. For example, the first area may also include the platform, the fourth area may also include the transformer 424, and the like.

Figure 10:
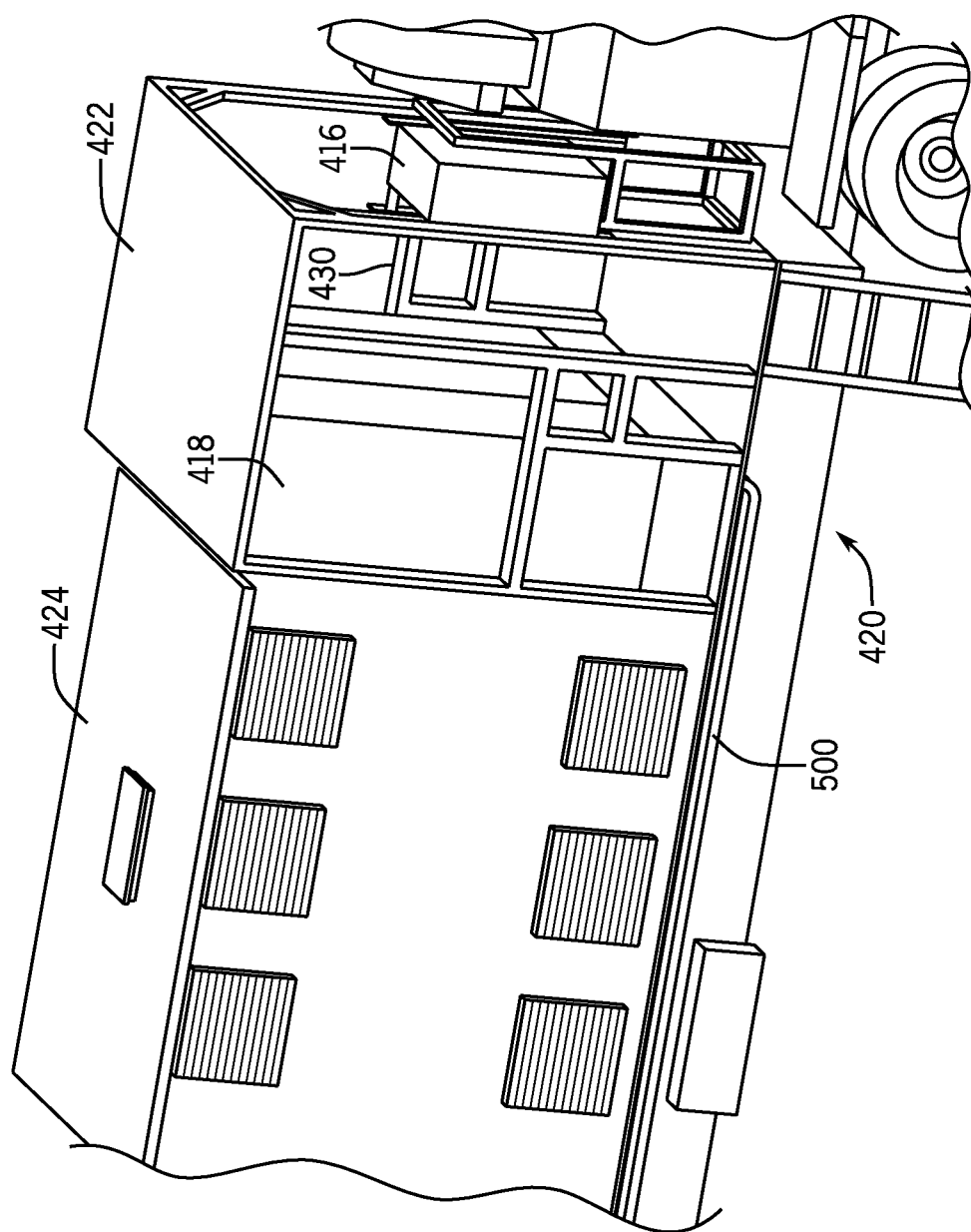
FIG. 10 is a perspective view of a platform of a pumping trailer, in accordance with embodiments of the present disclosure.

FIG. 10 is a perspective view of an embodiment of the pump trailer 400 illustrating the transformer 424 arranged proximate the VFD platform 420. As shown, the VFD platform 420 includes the platform cover 422, thereby enabling operators to perform maintenance or control operations in inclement weather. Furthermore, as described above, the cooling headers 500 are illustrated coupled to the VFD housing.

Figure 11:
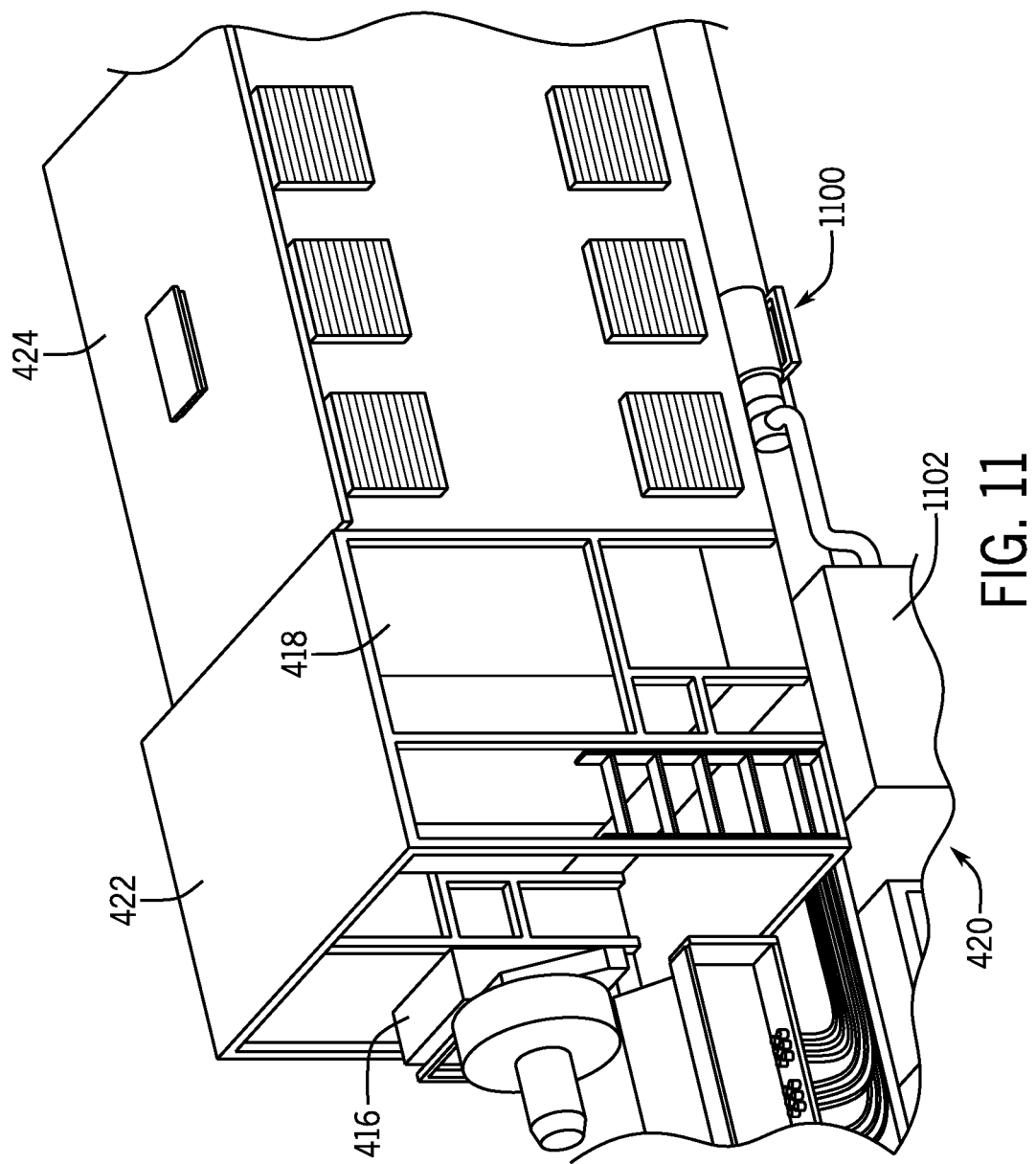
FIG. 11 is a perspective view of a platform of a pumping trailer, in accordance with embodiments of the present disclosure.

FIG. 11 is a perspective view of an embodiment the pump trailer 400 illustrating the transformer 424 arranged proximate the VFD platform 420. Moreover an auxiliary pump 1100 coupled to a tank 1102 is illustrated below the transformer 424 and the VFD platform 420.

Figure 12:
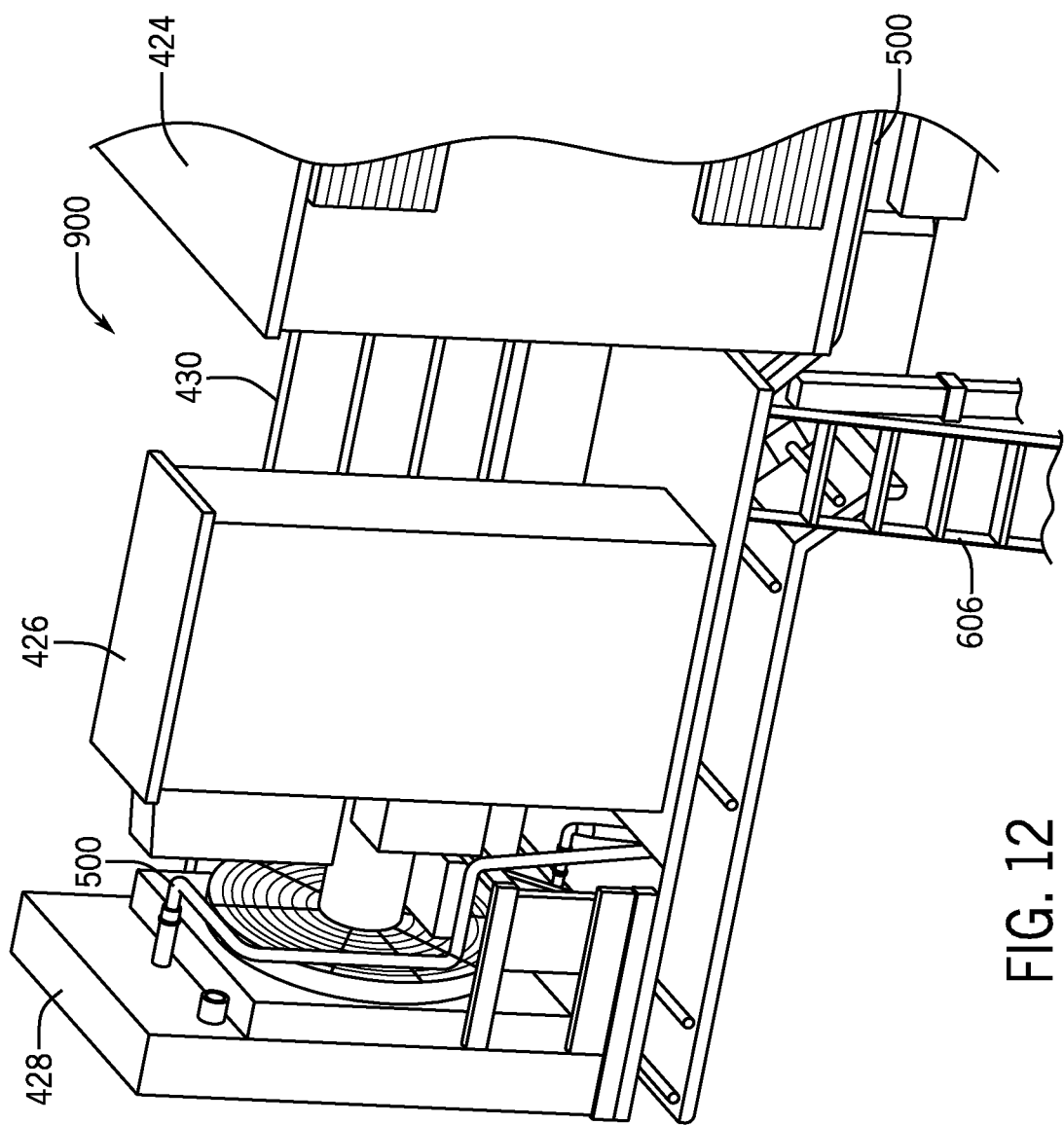
FIG. 12 is a perspective view of a platform of a pumping trailer, in accordance with embodiments of the present disclosure.

FIG. 12 is a perspective view of an embodiment of the transformer service platform 900 arranged at the gooseneck 408. In the illustrated embodiment, the cooling system 428 includes a radiator that distributes cooling liquid (e.g., water/glycol) via the headers 500. The MCC 426 is arranged proximate the cooling system 428. Also illustrated in the ladder 606, described above.

Figure 13:
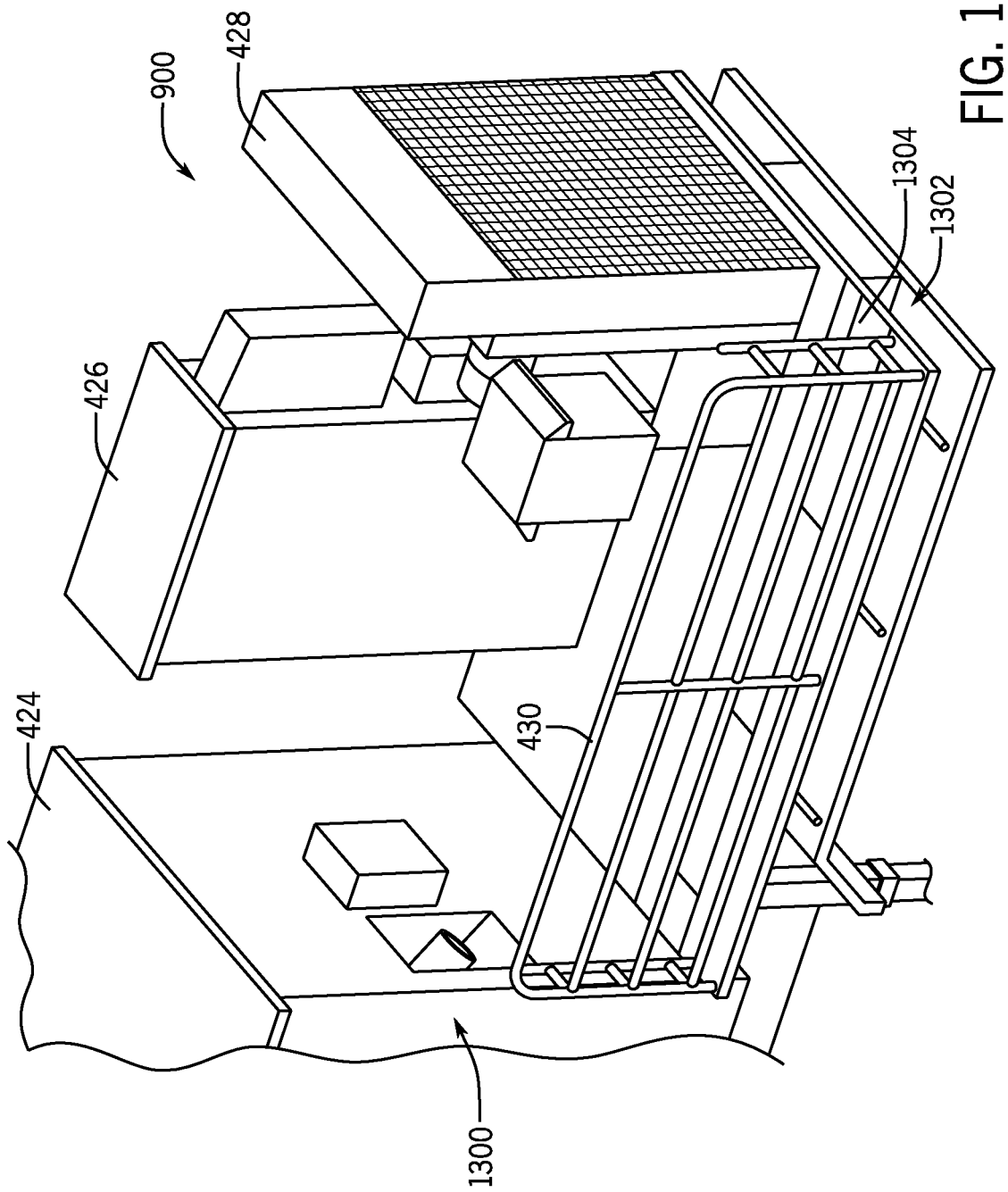
FIG. 13 is a perspective view of a platform of a pumping trailer, in accordance with embodiments of the present disclosure.

FIG. 13 is a perspective view of an embodiment of the transformer service platform 900 including the cooling system 428 and the MCC 426. In the illustrated embodiment, the transformer 424 is accessible via the platform 900 and includes a connection 1300 for receiving a single 13.8 kV cable. The illustrated embodiment further includes cable trays 1302 arranged below hinged covers 1304 within the floor of the platform 900. As a result, cables may be arranged along the platform 900 within the trays to reduce the likelihood of damage.

As described above, the switchgears may further include features such as a solid insulated main circuit. The insulation may include epoxy or ethylene propylene diene terpolymer (EPDM). The solid insulation may reduce exposure risk to live parts, which may be beneficial to in harsh environments that may include humidity, dust, pollution, and the like. Accordingly, the sensitivity to these harsh environments may be adjusted due to the insulation. Furthermore, the insulated main circuit may reduce phase-to-phase fault risks. In various embodiments, the solid insulation is ground shielded, which may extend life expectancy. Furthermore, in various embodiments, use of the solid insulation may extend switchgear life and increase reliability.

Additional features may also include vacuum circuit breakers, an isolating ground switch within a sealed tank with air at atmospheric pressure, and medium voltage cables directly grounded with the isolation ground switch before opening the cable department panels.

Moreover, arranging the devices in series, as noted above, may provide double isolation between the busbars and various cables. In certain embodiments, SF6 is excluded and the system is RoHS compliant, which reduces environmental concerns.

Embodiments of the present disclosure may also include integrated core units. These units enable simple operation, with three positions for each unit: connected, open, and grounded. An intuitive active mimic bus diagram may also be included, with clear indicators for the circuit breaker and grounding switch. Furthermore, interlocks between functions may be positively driven and built-in as standard.

The system may also include cubicle architecture for all circuit breakers, as well as multiple circuit breaker load options and two types of operating mechanisms. For example, D01N and D02N: 100 A and 200 A circuit breakers may be utilized for light load and operation. In embodiments, D06N: 600 A circuit breaker may be utilized for simple protection and light operation. Furthermore, in operation, D06H/D12H: 600 A and 1200 A circuit may be used for standard/heavy duty load and operation.

Use of modular system architecture may simplify installation and upgrades. In embodiments, core units may be optimized for dedicated applications, but may also be arranged to share features such as dimensions and footprint (e.g., 14.75 in. (375 mm) base form factor width), auxiliaries (e.g., electrical operation devices, accessories, options, etc.), intuitive operation, and elbow-style cable connections.

In embodiments, additional features of the present disclosure may include a live cable interlock to help prevent the grounding of live cables in main circuit breakers, as well as for feeder breakers. Furthermore, a cable test device interlocked with isolating ground switch, simplifying cable testing and diagnosis. For example, cable testing may commence without accessing the cable compartment. Additionally, test device connection may be made from the front of the switchgear, while cables remain grounded. Also, in embodiments, interlocks may include a grounded wye point.

Additionally, in embodiments, an auto-transfer scheme is included without traditional iron care VT to provide an open or closed transition (hold time contact for voltage sync devices). Additionally, self-powered protection with embedded communications and integrated metering and power measurement functions may be included. In embodiments, there is integration of power measurement in feeders without additional space.

Embodiments the present disclosure also include switchgear automation features. For example, modular architecture may be used for scalable solutions (e.g., distributed intelligence). Furthermore, switchgears may be linked by field bus using standard ethernet Modbus protocol and also have capabilities to enable integration in SCADA systems via multiple protocols (Modbus, IEC 61850, wireless). The switchgear may also include embedded web interface metering.

In various embodiments, each switchgear subassembly is made up of functional units, each representing a type-tested assembly composed of a basic core unit and other functional blocks designed to work together in any combination. The core units may be optimized for each typical application, and the assembly forms an insulated functional unit with reduced sensitivity to the environment. Accordingly, the system makes it possible to meet electric powered hydraulic fracturing need while also providing flexibility and simplicity in the design of functional units, a small footprint for space savings, environmentally robust components, along with easy extensions and upgrades.

As described above, the switchgear may include various components. Each functional section is equal to an assembly of functional blocks composed of: 1) a core unit that may include a circuit breaker, riser unit, and bus ground switch; 2) an LV cabinet that provides protection, measurement, and control; 3) a busbar connection that can be copper or aluminum; 4) bottom connections includes cables and busbars; 5) a bottom compartment including a cable box and an extra base plinth; 6) sensors such as CTs and VTs; and 7) a communication network that works through Radio/GSM/GPRS/EthernetlWireless/and other connected connections. The communication network may be used for fault detection, protection, measurement, local control and/or remote control.

As noted above, in embodiments, the switchgear may include a solid and shielded insulation to provide protection from environmental impacts, negate electric fields in the switchgear, and extend maintenance intervals. Furthermore, the ground shielded system also helps to extended the equipment service life, resulting a lower total cost of ownership.

The system describes herein may be arranged such that no part of the main circuit is exposed to free air. As a result, there is a reduced risk of internal arching and maintenance operations may be optimized, leading to a reduced risk of downtime.

In various embodiments, the switchgear includes a common load sharing bus. This bus may be housed in switchgear A (FIG. 2). However, two switchgears with a tie breaker acts as a common bus, and embodiments having a single switchgear trailer also have an integrated common bus.

Figure 14C:
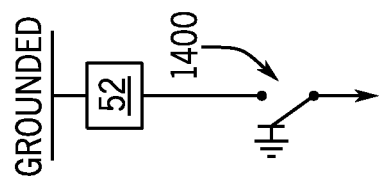
FIGS. 14A-C are schematic views of an embodiment of switchgear operational design, in accordance with embodiments of the present disclosure.
Figure 14B:
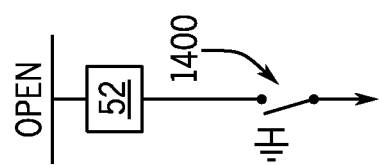
Figure 14A:
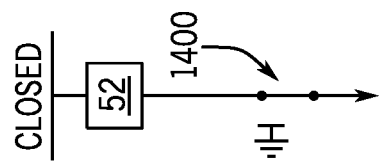

As described above, in various embodiments the switchgear includes integrated core units including three positions: connected, open, and grounded. FIGS. 14A-14C illustrates the three-in-one switchgear design. In the illustrated embodiment, the circuit breaker is in series with the isolating ground switch, which, combined with interlocks, provides integrally designed protection. There are also only three possible operating positions: closed, open, and grounded.

FIG. 14A illustrates the closed position. FIG. 14B illustrates the open position, and FIG. 14C illustrates the grounded position. A switch 1400 moves between the positions to facilitate transmission of electrical energy between the components.

Figure 15:
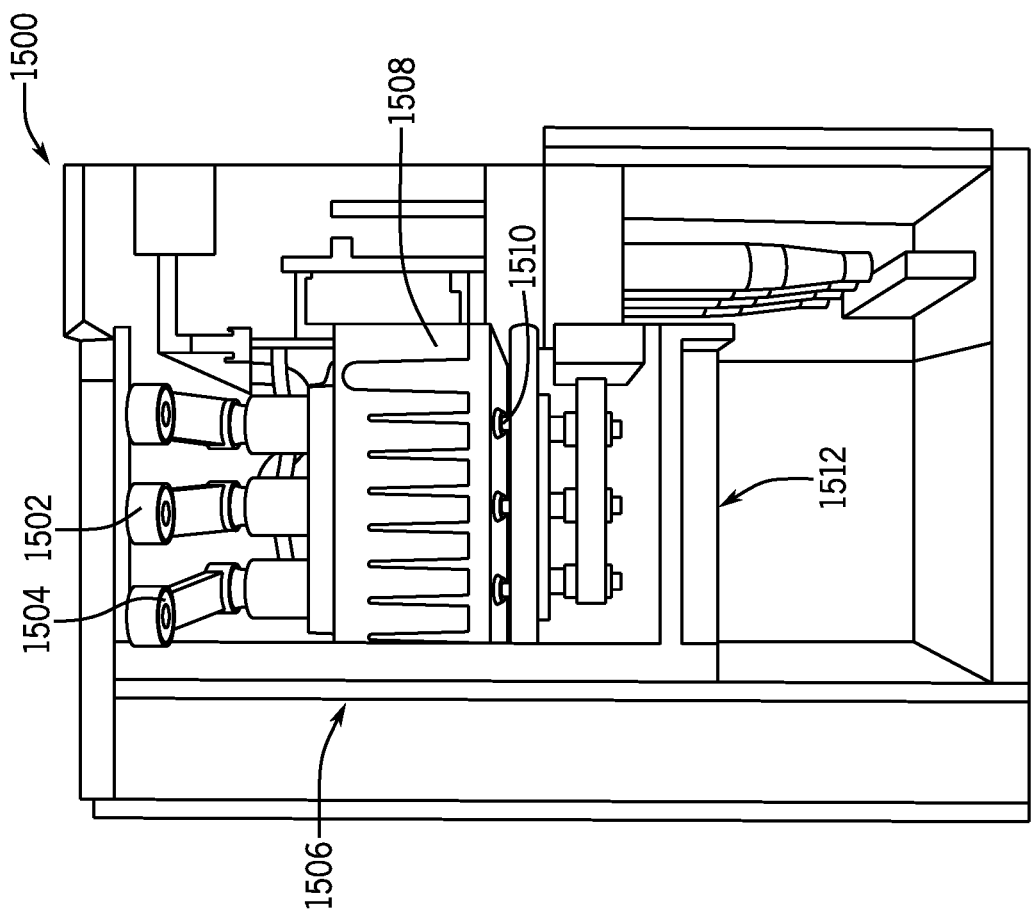
FIG. 15 is a perspective view of internal components of a switchgear, in accordance with embodiments of the present disclosure.

FIG. 15 is a perspective view of an embodiment of a switchgear 1500 including features described herein. For example, the illustrated switchgear 1500 includes shielded solid insulation 1502 surrounding a busbar 1504. The shielded solid insulation 1502 further extends along vacuum bottles. An integrated isolated ground switch assembly 1506 includes the isolating ground switch enclosed in a tank 1508, as described above, and further covered in solid insulation 1502. Sensors 1510 are arranged along a bottom of the tank 1508 in the illustrated embodiment, which may be used for optimized protection and control, as noted above. Furthermore, the illustrated embodiment includes front aligned cable connections 1512, which are also shielded by the insulation 1502, to facilitate easy cable installation.

Figure 16:
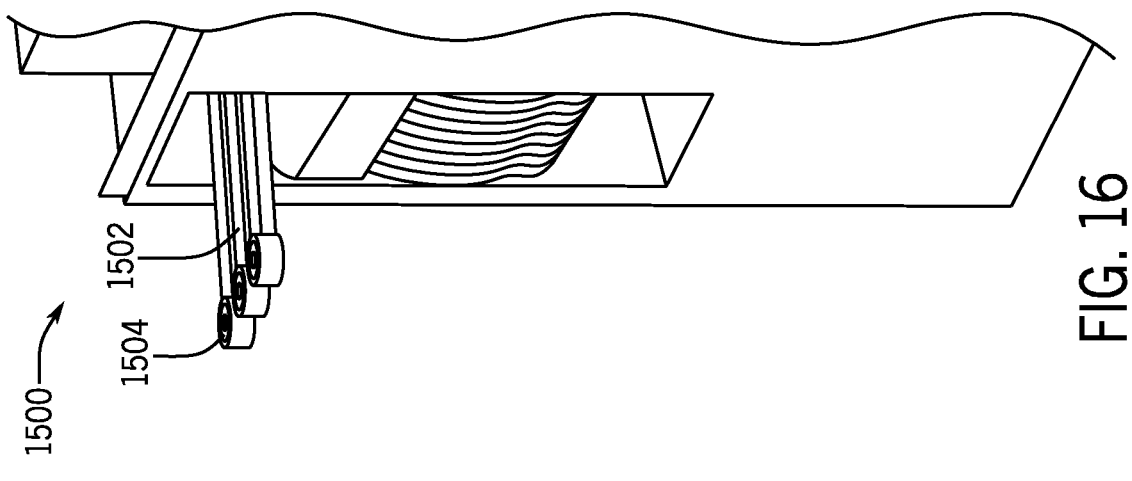
FIG. 16 is a perspective view of an embodiment of a switchgear, in accordance with embodiments of the present disclosure.

FIG. 16 is a perspective view of the switchgear 1500 includes the busbars 1504 covered, at least partially, by the solid insulation 1502. As described above, the insulation may improve the expected working life of the equipment, among other benefits.

The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

The invention claimed is:

1. A hydraulic fracturing system for fracturing a subterranean formation, comprising:
    an electric powered pump coupled to a well associated with the subterranean formation and powered by at least one electric motor, the electric powered pump configured to pump fluid into a wellbore associated with the well;
    a variable frequency drive (VFD) connected to the at least one electric motor to control the speed of the at least one electric motor;

a transformer for conditioning power to the electric powered pump, the power being received from at least one generator at a voltage higher than an operating voltage of the electric pump; and a switchgear, receiving power from at least one generator, configured to distribute power to a plurality of pieces of wellsite equipment, the switchgear having a common load sharing bus and front aligned, shielded cable connections, the switchgear being positioned within an enclosure;

wherein the electric powered pump, the VFD, the switchgear, and the transformer are mounted on a common support structure and a single cable couples the switchgear to the transformer.

2. The system of claim 1, wherein the common load sharing bus is configured to synchronize three-phase power of a similar voltage and frequency from different sources, the switchgear evenly distributing an electrical load between the electric powered pump and the at least one generator.

3. The system of claim 1, wherein the common load sharing bus is configured to isolate the electric powered pump, the at least one generator, and the switchgear.

4. The system of claim 1, wherein the electric powered pump, the VFD, and the transformer are mounted on the common support structure and a second single cable couples the switchgear to the common support structure.

5. The system of claim 1, further comprising:
a cooling system providing a cooling fluid to the VFD via one or more headers.

6. The system of claim 1, wherein the switchgear comprises:
integrated core units configured to operate in a connected position, an open position, or a grounded position.

7. The system of claim 6, wherein the switchgear further comprises:
an isolating ground switch, enclosed within a tank arranged proximate the common load sharing bus; and
cable connections for coupling to the switchgear.

8. The system of claim 1, wherein the common support structure is at least one of a trailer, a skid, a pad, a truck bed, or a combination thereof.

9. The system of claim 1, further comprising:
cable trays positioned below a walking surface of the common support structure, the cable trays being covered by a hinged cover that pivots to provide access to one or more cable trays.

10. The system of claim 1, further comprising:
a human machine interface, positioned proximate the VFD; and
a platform cover at least partially covering the humane machine interface and VFD.

* * * * *